(12) United States Patent
Lee et al.

(10) Patent No.: US 11,140,317 B2
(45) Date of Patent: Oct. 5, 2021

(54) METHOD AND DEVICE FOR MANAGING THUMBNAIL OF THREE-DIMENSIONAL CONTENTS

(71) Applicant: Samsung Electronics Co., Ltd., Gyeonggi-do (KR)

(72) Inventors: Jung Hee Lee, Seoul (KR); Yong Joon Jeon, Gyeonggi-do (KR); Eun Jung Hyun, Seoul (KR)

(73) Assignee: Samsung Electronics Co., Ltd.

( * ) Notice: Subject to any disclaimer, the term of this patent is extended or adjusted under 35 U.S.C. 154(b) by 4 days.

(21) Appl. No.: 15/854,441

(22) Filed: Dec. 26, 2017

(65) Prior Publication Data
US 2018/0184000 A1    Jun. 28, 2018

(30) Foreign Application Priority Data
Dec. 23, 2016 (KR) .................. 10-2016-0178382

(51) Int. Cl.
*H04N 5/232* (2006.01)
*G02B 27/01* (2006.01)
(Continued)

(52) U.S. Cl.
CPC ..... *H04N 5/23238* (2013.01); *G02B 27/0093* (2013.01); *G02B 27/017* (2013.01);
(Continued)

(58) Field of Classification Search
CPC ........... H04N 5/23238; H04N 5/23293; H04N 5/232945; G02B 27/017; G02B 27/0093; G03B 34/02; G03B 35/18; G06F 3/04845; G06F 3/012; G06F 3/04815; G06F 3/0484; G06F 2203/04806; G06T 15/20; G11B 27/102
(Continued)

(56) References Cited

U.S. PATENT DOCUMENTS 8,422,857 B2    4/2013  Kashima
8,427,396 B1    4/2013  Kim
(Continued)

FOREIGN PATENT DOCUMENTS

CN  101729781  6/2010
CN  102124746  7/2011
(Continued)

OTHER PUBLICATIONS

International Search Report dated Apr. 5, 2018 issued in counterpart application No. PCT/KR2017/015400, 11 pages.
(Continued)

*Primary Examiner* — Kent W Chang
*Assistant Examiner* — Sujit Shah
(74) *Attorney, Agent, or Firm* — The Farrell Law Firm, P.C.

(57) ABSTRACT

An electronic device is provided. The electronic device includes a display and a processor electrically connected with the display and a memory and configured to use a first content in a 3-dimensional (3D) space in response to executing the first content, render an area corresponding to a field of view (FOV), and store information relating to the FOV in the memory as metadata of the first content in response to a specified event.

18 Claims, 14 Drawing Sheets

(51) Int. Cl.
*G03B 37/02* (2021.01)
*G06T 15/20* (2011.01)
*G06F 3/0481* (2013.01)
*G06F 3/01* (2006.01)
*G02B 27/00* (2006.01)
*G06F 3/0484* (2013.01)
*G11B 27/10* (2006.01)
*G03B 35/18* (2021.01)

(52) U.S. Cl.
CPC .............. *G03B 37/02* (2013.01); *G06F 3/012* (2013.01); *G06F 3/0484* (2013.01); *G06F 3/04815* (2013.01); *G06T 15/20* (2013.01); *G11B 27/102* (2013.01); *H04N 5/232945* (2018.08); *G03B 35/18* (2013.01); *G06F 3/04845* (2013.01); *G06F 2203/04806* (2013.01)

(58) Field of Classification Search
USPC .......................................................... 345/156
See application file for complete search history.

(56) References Cited

U.S. PATENT DOCUMENTS

| | | | |
|---|---|---|---|
| 8,666,231 B2 | 3/2014 | Sasaki et al. | |
| 8,730,131 B2 | 5/2014 | Kim | |
| 9,113,134 B2 | 8/2015 | Kashima | |
| 9,113,193 B1* | 8/2015 | Gardes | H04N 21/4113 |
| 9,423,619 B2 | 8/2016 | Kim | |
| 9,442,567 B2 | 9/2016 | Scott et al. | |
| 9,473,758 B1 | 10/2016 | Long et al. | |
| 9,582,168 B2 | 2/2017 | Lee et al. | |
| 9,632,314 B2 | 4/2017 | Cho | |
| 10,867,119 B1* | 12/2020 | Karppanen | G06K 9/00288 |
| 2006/0192776 A1* | 8/2006 | Nomura | H04N 13/189 345/419 |
| 2010/0299630 A1 | 11/2010 | McCutchen et al. | |
| 2012/0224832 A1* | 9/2012 | Lee | G11B 27/105 386/230 |
| 2012/0307052 A1 | 12/2012 | Thiruvengada et al. | |
| 2013/0324192 A1* | 12/2013 | Lee | H04M 1/0266 455/557 |
| 2014/0015736 A1 | 1/2014 | Kim | |
| 2014/0191929 A1 | 7/2014 | Kim | |
| 2014/0321770 A1* | 10/2014 | Potdar | G06T 3/0012 382/282 |
| 2014/0351763 A1 | 11/2014 | Lee et al. | |
| 2014/0364212 A1 | 12/2014 | Osman et al. | |
| 2015/0205494 A1 | 7/2015 | Scott et al. | |
| 2015/0261775 A1 | 9/2015 | Shin et al. | |
| 2015/0287436 A1 | 10/2015 | Kashima | |
| 2015/0331242 A1* | 11/2015 | Cho | G02B 27/0101 345/8 |
| 2015/0358613 A1* | 12/2015 | Sandrew | G06T 15/205 348/36 |
| 2016/0214015 A1 | 7/2016 | Osman et al. | |
| 2016/0246456 A1 | 8/2016 | Murakami | |
| 2016/0283081 A1* | 9/2016 | Johnston | G06T 19/006 |
| 2016/0301862 A1* | 10/2016 | Rantakokko | G06F 3/011 |
| 2016/0323560 A1* | 11/2016 | Jin | H04N 5/23267 |
| 2016/0343164 A1* | 11/2016 | Urbach | G06T 19/006 |
| 2016/0361658 A1* | 12/2016 | Osman | A63F 13/525 |
| 2017/0124762 A1* | 5/2017 | Privault | G06T 19/20 |
| 2018/0311583 A1 | 11/2018 | Osman et al. | |
| 2018/0374192 A1* | 12/2018 | Kunkel | G06T 15/205 |

FOREIGN PATENT DOCUMENTS

| | | |
|---|---|---|
| CN | 105516755 | 4/2016 |
| EP | 3 005 029 | 4/2016 |
| KR | 10-2014-0136732 | 12/2014 |
| WO | WO 2014/014155 | 1/2014 |
| WO | WO 2014/197337 | 12/2014 |

OTHER PUBLICATIONS

European Search Report dated Aug. 19, 2019 issued in counterpart application No. 17884233.2-1208, 8 pages.
European Search Report dated Jul. 27, 2020 issued in counterpart application No. 17884233.2-1208, 6 pages.
Chinese Office Action dated May 7, 2021 issued in counterpart application No. 201780075164.2, 15 pages.

* cited by examiner

METHOD AND DEVICE FOR MANAGING THUMBNAIL OF THREE-DIMENSIONAL CONTENTS

PRIORITY

This application claims priority under 35 U.S.C. § 119(a) to Korean Patent Application Serial number 10-2016-0178382, which was filed on Dec. 23, 2016 in the Korean Intellectual Property Office, the entire disclosure of which is incorporated herein by reference.

BACKGROUND

1. Field of the Disclosure

The present disclosure relates generally to a method for displaying and using three-dimensional contents, and more particularly, to a method and a device for managing thumbnails of three-dimensional contents.

2. Description of the Related Art

Three-dimensional (3D) contents generation/consumption devices, such as a head mount device for providing virtual reality and a 360-degree camera capable of taking an omni-directional image, are known. With respect to 3D contents, a user cannot view a screen in every direction at one time, and therefore only a portion of the entire contents area is visible to the user's eyes. The area visible to the user's eyes is referred to as a field of view (FOV).

When viewing a list of a plurality of image/video contents, a user usually selects contents in which the user is interested, by using a thumbnail. The thumbnail, a kind of preview, may be provided in such a manner that a full image is reduced to a size suitable for the thumbnail.

However, in a list in which 3D contents are included, serious distortion may occur when a thumbnail is generated by using known methods. For example, when using conventional methods, a 360-degree image is generated by stitching images taken using a plurality of lenses. If a thumbnail is generated using this image, a user may have difficulty in determining the situation in which the image represented by the thumbnail was taken and difficulty in determining what the image is a picture of. That is, the user may not be able to determine what the 3D contents are a picture of, through the existing thumbnail.

Furthermore, even at the same point in time, 3D contents may have a different FOV according to a direction in which a user's gaze is directed. Accordingly, a portion that represents the 3D contents or is emphasized in the 3D contents may vary from user to user.

SUMMARY

The present disclosure has been made to address at least the disadvantages described above and to provide at least the advantages described below.

According to an aspect of the present disclosure, by viewing only a thumbnail, a user may know the point where the user has stopped watching contents, and thus it is easy to use the contents. In accordance with an aspect of the present disclosure, there is provided an electronic device. The electronic device includes a display; a memory storing instructions; and at least one processor configured to execute the stored instructions to: implement a first content in a 3-dimensional (3D) virtual space; render an area corresponding to a field of view (FOV) of the first content being implemented in the 3D virtual space; and store information relating to the FOV in the memory as metadata of the first content in response to a specified event.

In accordance with an aspect of the present disclosure, there is provided an electronic device. The electronic device includes a memory storing instructions; a display; and at least one processor configured to execute the stored instructions to: implement a first content in a three-dimensional (3D) virtual space; render an area corresponding to a field of view (FOV) of the first content; and store a thumbnail of the first content generated based on information relating to the FOV in the memory in response to ending implementing of the first content.

In accordance with an aspect of the present disclosure, there is provided a non-transitory computer-readable storage medium stores instructions that, when executed by a processor of an electronic device, allow the electronic device to implement a first content in a 3-dimensional (3D) virtual space; render an area corresponding to a field of view (FOV) of the first content being implemented in the 3D virtual space; and store information relating to the FOV in the memory as metadata of the first content in response to a specified event.

Furthermore, a user may find it easy to emphasize a specific area when posting or sending 3D contents to other persons.

BRIEF DESCRIPTION OF THE DRAWINGS

The above and other aspects, features and advantages of certain embodiments of the present disclosure will be more apparent from the following detailed description taken in conjunction with the accompanying drawings, in which.

Throughout the drawings, it should be noted that like reference numbers are used to depict the same or similar elements, features, and structures.

DETAILED DESCRIPTION

Figure 1:
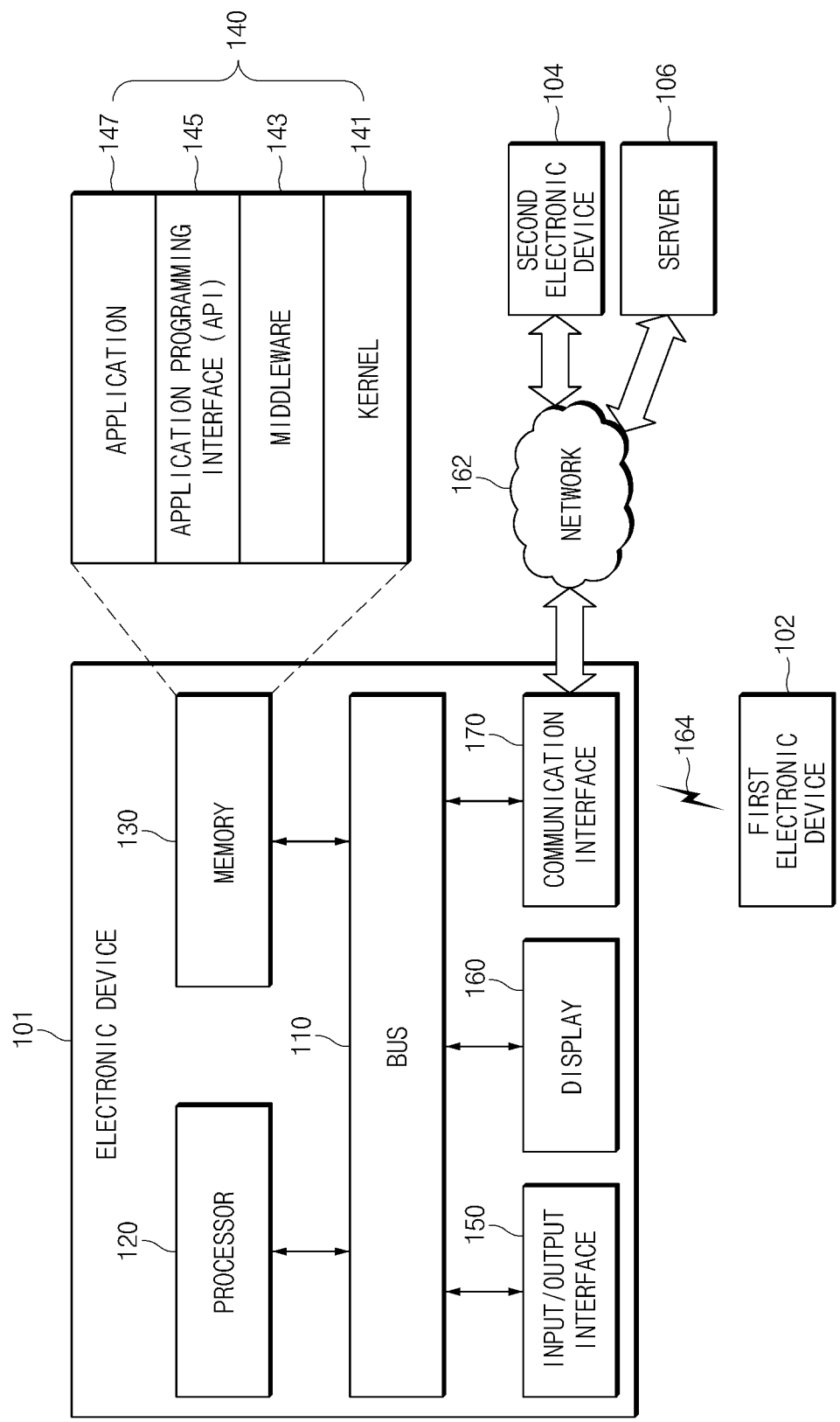
FIG. 1 is a diagram of an electronic device in a network environment, according to an embodiment of the present disclosure.

Embodiments of the present disclosure will be described herein below with reference to the accompanying drawings. However, the embodiments of the present disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may modify various elements regardless of an order and/or importance of the corresponding elements, and do not limit the corresponding elements. These terms may be used for the purpose of distinguishing one element from another element. For example, a first user device and a second user device may indicate different user devices regardless of the order or importance. For example, a first element may be referred to as a second element without departing from the scope the present invention, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a CPU or an application processor) capable of performing a corresponding operation by executing one or more software programs stored in a memory device.

The terms used in describing the various embodiments of the present disclosure are for the purpose of describing particular embodiments and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the present disclosure.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present invention may include at least one of an application-specific integrated circuit (ASIC) chip, a field-programmable gate arrays (FPGA), and a programmable-logic device for performing operations which has been known or are to be developed hereinafter.

An electronic device according to the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an Internet of Things (IoT) device (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices, and may include an electronic device according to the development of new technology.

Hereinafter, an electronic device will be described with reference to the accompanying drawings. In the present disclosure, the term "user" may indicate a person using an electronic device or a device (e.g., an artificial intelligence electronic device) using an electronic device.

FIG. 1 is a diagram of an electronic device in a network environment, according to an embodiment of the present disclosure.

Referring to FIG. 1, an electronic device 100, a first electronic device 102, a second electronic device 104, or a server 106 may be connected with each other over a network 162 or local wireless communication 164. The electronic device 100 includes a bus 110, a processor 120, a memory 130, an input/output interface 150, a display 160, and a communication interface 170. The electronic device 100 may not include at least one of the above-described elements or may further include other element(s).

The bus 110 may interconnect the above-described elements 110 to 170 and may include a circuit for conveying communications (e.g., a control message and/or data) among the above-described elements.

The processor 120 may include one or more of a central processing unit (CPU), an application processor (AP), or a communication processor (CP). The processor 120 may perform an arithmetic operation or data processing associated with control and/or communication of at least other elements of the electronic device 100.

The memory 130 may include a volatile and/or nonvolatile memory. The memory 130 may store instructions or data associated with at least one other element(s) of the electronic device 100. The memory 130 may store software and/or a program 140. The program 140 may include a kernel 141, a middleware 143, an application programming interface (API) 145, and/or an application program (application) 147. At least a part of the kernel 141, the middleware 143, or the API 145 may be referred to as an operating system (OS).

The kernel 141 may control or manage system resources (e.g., the bus 110, the processor 120, the memory 130, and the like) that are used to execute operations or functions of other programs (e.g., the middleware 143, the API 145, and the application 147). Furthermore, the kernel 141 may provide an interface that allows the middleware 143, the API 145, or the application 147 to access discrete elements of the electronic device 100 so as to control or manage system resources.

The middleware 143 may perform a mediation role such that the API 145 or the application 147 communicates with the kernel 141 to exchange data.

Furthermore, the middleware 143 may process one or more task requests received from the application 147 according to a priority. The middleware 143 may assign the priority, which makes it possible to use a system resource (e.g., the bus 110, the processor 120, the memory 130, or the like) of the electronic device 100, to at least one of the application 147. The middleware 143 may process the one or more task requests according to the priority assigned to the at least one, which makes it possible to perform scheduling or load balancing on the one or more task requests.

The API 145 may be an interface through which the application 147 controls a function provided by the kernel 141 or the middleware 143, and may include at least one interface or function (e.g., an instruction) for a file control, a window control, image processing, a character control, or the like.

The input/output interface 150 may be an interface which transmits an instruction or data input from a user or another external device, to other element(s) of the electronic device 100. Furthermore, the input/output interface 150 may output an instruction or data, received from other element(s) of the electronic device 100, to a user or another external device.

The display 160 may include, for example, a liquid crystal display (LCD), a light-emitting diode (LED) display, an organic LED (OLED) display, a microelectromechanical systems (MEMS) display, or an electronic paper display. The display 160 may display, for example, various contents (e.g., a text, an image, a video, an icon, a symbol, and the like) to a user. The display 160 may include a touch screen and may receive a touch, gesture, proximity, or hovering input using an electronic pen or a part of a user's body.

The communication interface 170 may establish communication between the electronic device 100 and the first electronic device 102, the second electronic device 104, or the server 106. The communication interface 170 may be connected to the network 162 over wireless communication or wired communication to communicate with the second electronic device 104 or the server 106.

The wireless communication may use at least one of long-term evolution (LTE), LTE advanced (LTE-A), code division multiple access (CDMA), wideband CDMA (WCDMA), universal mobile telecommunications system (UMTS), wireless broadband (WiBro), global system for mobile communications (GSM), or the like, as cellular communication protocol. Furthermore, the wireless communication may include the local wireless communication 164. The local wireless communication 164 may include at least one of wireless-fidelity (Wi-Fi), Bluetooth (BT), near field communication (NFC), magnetic stripe transmission (MST), a global navigation satellite system (GNSS), or the like.

The MST may generate a pulse in response to transmission data using an electromagnetic signal, and the pulse may generate a magnetic field signal. The electronic device 100 may transfer the magnetic field signal to a POS device, and the POS may detect the magnetic field signal using an MST reader. The POS device may recover the data by converting the detected magnetic field signal to an electrical signal.

The GNSS may include at least one of a global positioning system (GPS), a global navigation satellite system (Glonass), a Beidou navigation satellite system (Beidou), or an European global satellite-based navigation system (Galileo) based on an available region, a bandwidth, or the like. Hereinafter, GPS and GNSS may be interchangeably used. The wired communication may include at least one of, for example, a universal serial bus (USB), a high definition multimedia interface (HDMI), a recommended standard-232 (RS-232), a plain old telephone service (POTS), or the like. The network 162 may include at least one of telecommunications networks a computer network (e.g., local area network (LAN) or wide area network (WAN)), an Internet, or a telephone network.

Each of the first and second electronic devices 102 and 104 may be a device of which the type is different from or the same as that of the electronic device 100. The server 106 may include a group of one or more servers. All or a portion of operations that the electronic device 100 will perform may be executed by the first electronic device 102, the second electronic device 104 or the server 106. When the electronic device 100 executes any function or service automatically or in response to a request, the electronic device 100 may not perform the function or the service internally, but, alternatively or additionally, it may request at least a portion of a function associated with the electronic device 100 at the electronic device 102 or 104 or the server 106, which may execute the requested function or additional function and may transmit the execution result to the electronic device 100. The electronic device 100 may provide the requested function or service using the received result or may additionally process the received result to provide the requested function or service. To this end, cloud computing, distributed computing, or client-server computing may be used.

Figure 2:
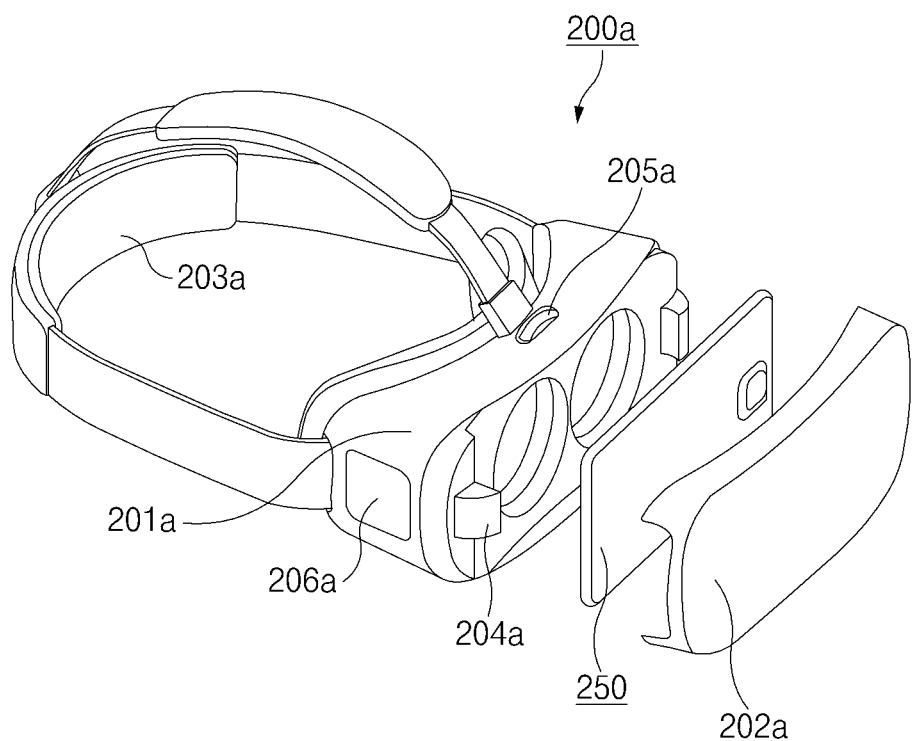
FIG. 2 is a diagram of a head mounted display (HMD) devices, according an embodiment of the present disclosure.
Figure 2:
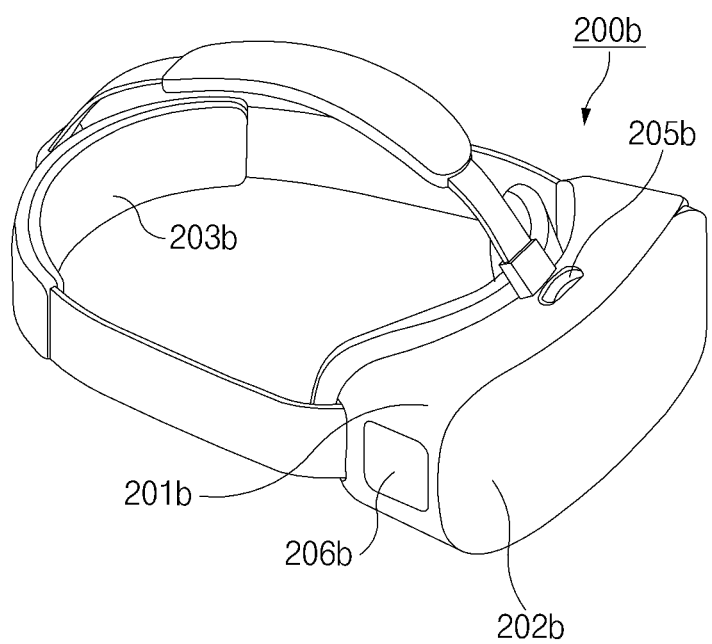

FIG. 2 is a diagram of HMD devices, according to an embodiment of the present disclosure. An HMD device 200a can be combinable with the electronic device 100, and an HMD device 200b can be an integrated device that includes its own processor and a display. The HMD devices 200a and 200b may include some elements in common. An HMD device 200 (FIG. 3) described herein may include the HMD device 200a and the HMD device 200b, or may be the HMD device 200a or 200b suitable for each embodiment. For example, the HMD device 200 may include a sensor (e.g., an inertial sensor, a gravity sensor, a gyro sensor, a geomagnetic sensor, or the like) for detecting a gaze direction of a user having the HMD device 200 worn on their head.

Continuing with reference to FIG. 2, a user terminal 250 (e.g., a smartphone) compatible with the HMD device 200a may be mounted in the HMD device 200a. The user terminal 250 herein may correspond to the electronic device 100 of FIG. 1.

The HMD device 200a may differ from the HMD device 200b in that the user terminal 250 is mounted in the HMD device 200a, and may be electrically or operatively combined with the user terminal 250, which has an ability to implement an image, to use resources of the user terminal 250.

In another example, the HMD device 200b may have an ability to implement a display by itself (i.e., stand-alone where the user terminal 250 is not separately mounted in the HMD device 200b). The HMD device 200b may include, at least some elements included in the HMD device 200a and the user terminal 250. When the HMD device 200b is capable of implementing a display by itself, the HMD device 200b may receive rendering data from the user terminal 250 and may output the received rendering data through its own display. The HMD device 200b may receive rendering data to be output on the display by using hardware/software resources of a non-illustrated PC or any peripheral device electrically connected thereto, in addition to the user terminal 250. In this case, the HMD device 200b may be physically and electrically connected with the user terminal 250 through a connector. The HMD device 200b may include a communication circuit for configuring a wireless network and may be operatively connected with a resource-providing device through a wireless network, such as BT, Wi-Fi, or the like. In other words, the HMD device 200b may be wiredly/wirelessly connected with the resource-providing device through an appropriate communication interface (e.g., the communication interface 170).

Among elements of the HMD device 200b, elements (e.g., 201b, 202b, 203b, and the like) corresponding to those of the HMD device 200a may not be described.

The HMD device 200a may include a main frame 201a, a cover 202a, and a mounting member 203a.

The main frame 201a may have a space for receiving the user terminal 250, and the main frame 201a may include a connector 204a, a screen location adjustment unit 205a, and/or an input unit 206a. The main frame 201a may further include a lens adjustment unit.

The connector 204a may be coupled with a connector (e.g., a USB interface) of the user terminal 250. The HMD device 200a and the user terminal 250 may interact with each other through the USB interface.

The screen location adjustment unit 205a may be configured to move a screen of the user terminal 250 to a suitable location for the user to watch the screen. The screen location adjustment unit 205a may be implemented in hardware or software and may be provided at a plurality of positions on the exterior of the main frame 201a.

The input unit 206a may be a user interface, and the user may control a graphical user interface (GUI) of the user terminal 250 through the input unit 206a. The input unit 206a may be provided on one surface (e.g., a right side surface) of the main frame 201a. The input unit 206a may correspond to a touch pad for receiving a touch input (e.g., a direct touch input or a hovering input).

An input through the input unit 206a may be transmitted to the user terminal 250, and in response to the received input, the user terminal 250 may provide a function corresponding to the input. The user may perform a touch input on the touch pad to adjust the volume of contents or to control reproduction of an image. A plurality of input units may exist, in addition to the input unit 206a illustrated in FIG. 2. The input unit 206a may include a physical button, a touch key, a joystick, or a wheel key, in addition to the touch pad.

The cover 202a may be secured to the main frame 201a to cover the space in which the user terminal 250 is received.

The mounting member 203a may be connected to the main frame 201a so that a user can wear the HMD device 200a on a part (e.g., the head) of the user's body. The mounting member 203a may include a band, Velcro™ tape, or the like that is formed of an elastic material. The main frame 201a may be held closer to the user's eyes by the mounting member 203a. The mounting member 203a may be implemented with eyeglass temples, a helmet, straps, or the like.

Figure 3:
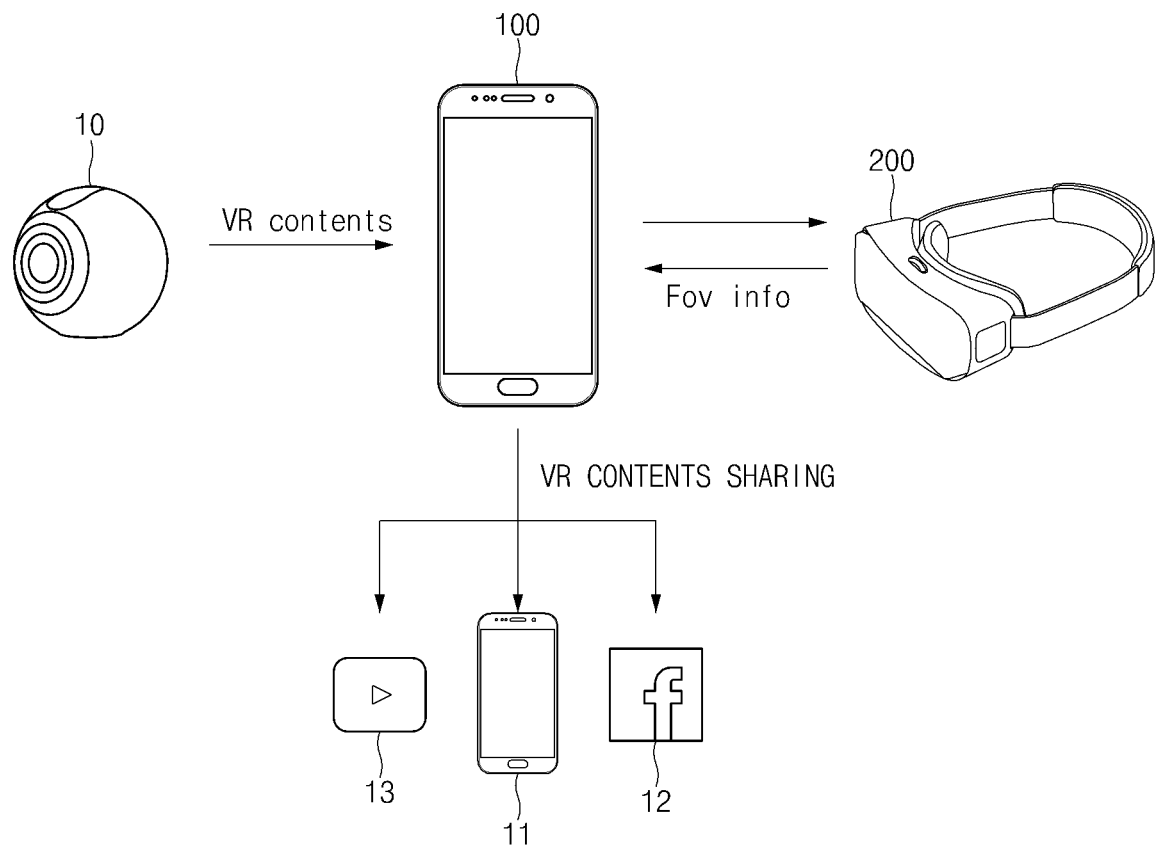
FIG. 3 is a diagram of an operating environment of an electronic device, according an embodiment of the present disclosure.

FIG. 3 is a diagram of an operating environment of an electronic device, according to an embodiment of the present disclosure.

Referring to FIG. 3, the electronic device 100 may obtain 3D contents, such as virtual reality (VR) contents, from a contents generation device 10. The 3D contents may include a 360-degree image, a 360-degree video, 3D virtual reality data, and the like that a user is able to watch in any direction. The term contents used herein to mean 3D contents unless otherwise specified.

The contents generation device 10 may correspond to a device for generating 3D contents. The contents generation device 10 may include a plurality of lenses and may generate a 3D image with the contents generation device 10 as the center, by combining (or stitching) separate images simultaneously taken by using the plurality of lenses. The contents generation device 10 may generate a 3D video in a similar manner.

The contents generation device 10 may correspond to a 3D contents providing server. The electronic device 100 may obtain 3D contents or 3D virtual environment data from the server.

The electronic device 100 may generate 3D contents by itself, or may have 3D contents stored in the memory 130 of the electronic device 100.

The electronic device 100 may be combined with the HMD device 200 to operate, and this operating type may be referred to as a drop-in type. The electronic device 100 and the HMD device 200 may be used independently of each other. The HMD device 200 in FIG. 3 may correspond to any one of the HMD device 200a and the HMD device 200b of FIG. 2.

The electronic device 100 may reproduce 3D contents in a state of being combined with the HMD device 200. If an instruction to execute a first content, which is 3D contents, is entered into the electronic device 100, the electronic device 100 may implement the first content in a 3D virtual space. When the electronic device 100 is combined with the HMD device 200, the electronic device 100 may generate a left-eye image and a right-eye image to allow the user to recognize the first content as a 3D space through lenses of the HMD device 200.

The electronic device 100 may obtain, from the HMD device 200, gaze information for determining an FOV. The HMD device 200 may include a sensor (e.g., an inertial sensor, a gravity sensor, a gyro sensor, a geo-magnetic sensor, or the like) for detecting the gaze direction of the user having the HMD device 200 worn on their head. The HMD device 200 may detect the user's gaze direction by defining a reference gaze direction corresponding to reference time (e.g., the time when the first content starts to be reproduced) and sensing motion information (e.g., distance, angle, and the like) of the HMD device 200 relative to the reference gaze direction. If the electronic device 100 obtains, from the HMD device 200, information, such as the gaze direction, for determining an FOV (hereinafter, referred to as FOV information), the electronic device 100 may generate a thumbnail image corresponding to the first content, or may generate metadata defining the thumbnail, based on the FOV information.

The user of the electronic device 100 may share the first content with other users. The user of the electronic device 100 may send the first content to another electronic device 11, or may share the first content through a social network service 12 or a video streaming service 13. When transmitting the first content (e.g., transmitting the first content to the other electronic device 11 or uploading the first content to servers that provide the services 12 and 13), the electronic device 100 may transmit the thumbnail image together with the first content, or may transmit the first content including the metadata that defines the thumbnail.

Figure 4:
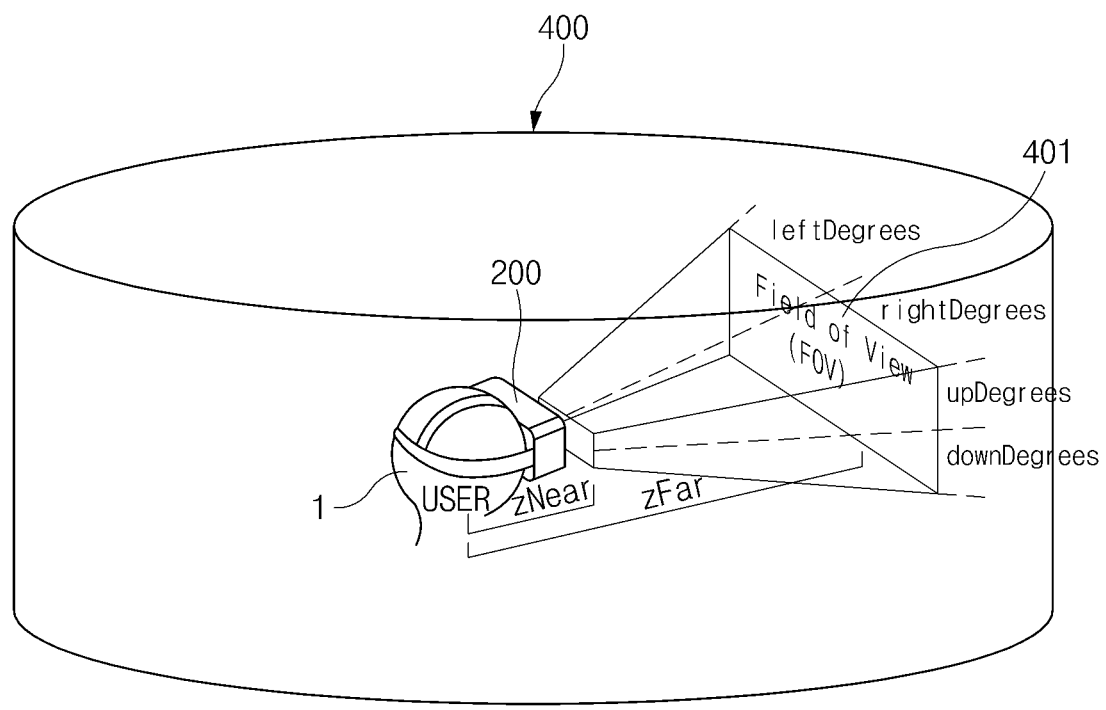
FIG. 4 is a diagram of a method of determining an FOV, according an embodiment of the present disclosure.

FIG. 4 is a diagram of a method of determining an FOV, according to an embodiment of the present disclosure.

Figure 6:
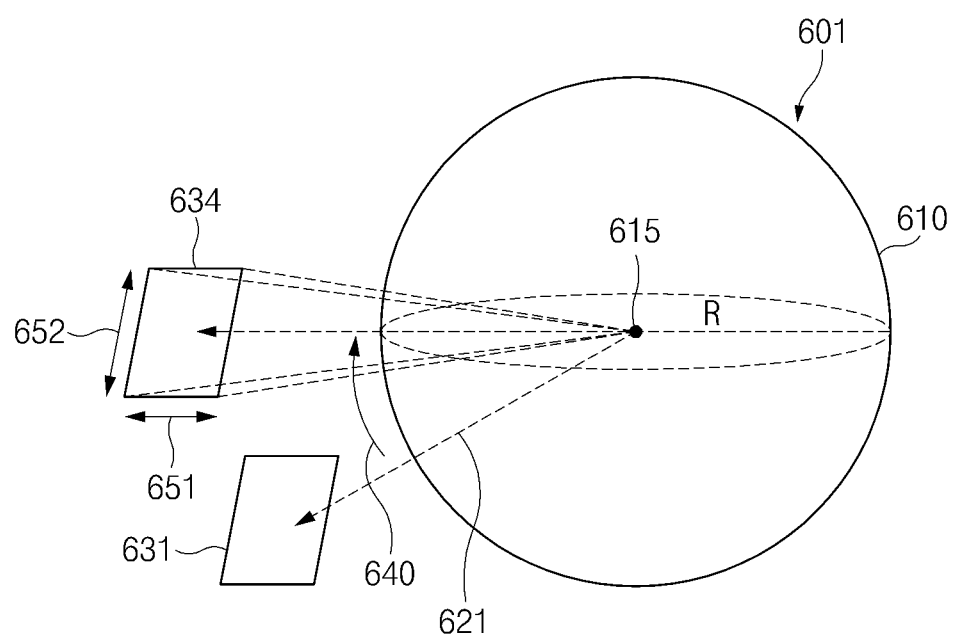
FIG. 6 is a diagram of a 3D space, according an embodiment of the present disclosure.

A user 1 views a 3D virtual space 400, with the HMD device 200 worn on their head. The HMD device 200 may be any one of the HMD device 200a having the electronic device 100 mounted therein and the integrated HMD device 200b. The following description will be given based on the electronic device 100 being mounted in the HMD device 200a. Furthermore, while the 3D virtual space 400 is illustrated in FIG. 4 having a cylindrical shape, this is for illustrative purposes, and the 3D virtual space 400 may be implemented with a sphere with the user 1 as the center, as illustrated in FIG. 6, for example.

The user 1 may face one direction in the 3D virtual space 400. An FOV 401 of the user 1 may be determined based on the place where the user's gaze is directed. The electronic device 100 may determine the FOV 401 based on a left-side angle (e.g., leftDegrees), a right-side angle (e.g., rightDegrees), an upper-side angle (e.g., upDegrees), a lower-side angle (e.g., downDegrees), and a distance zFar to a far plane with respect to the gaze direction. For the convenience of description, assuming that the gaze direction is directed toward the center of the FOV 401, the FOV 401 may be assumed to have left- and right-side angles of 90 degrees and upper- and lower-side angles of 65 degrees. In another example, the gaze direction may be directed toward a point that is located on the vertical center line of the FOV 401 and is lower than the center of the FOV 401. In this case, the left- and right-side angles may be equal to each other; however, the upper-side angle may be defined to be larger than the lower-side angle.

When reproducing the first content in the 3D virtual space 400, the electronic device 100 may reproduce the first content based on the FOV 401. That is, since it is impossible for the user 1 to view all points in the 3D virtual space 400 at one time, the electronic device 100 may visualize a space that corresponds to an area determined based on the FOV 401 of the user 1. The electronic device 100 may obtain gaze information from the HMD device 200a, may determine the FOV 401 obtained on the basis of the gaze information, and may render a space corresponding to the determined FOV 401. An object closer to the user 1 than a near plane, which is spaced a distance zNear apart from the user 1, and an object further away from the user 1 than the far plane may be excluded from the rendering.

Figure 5:
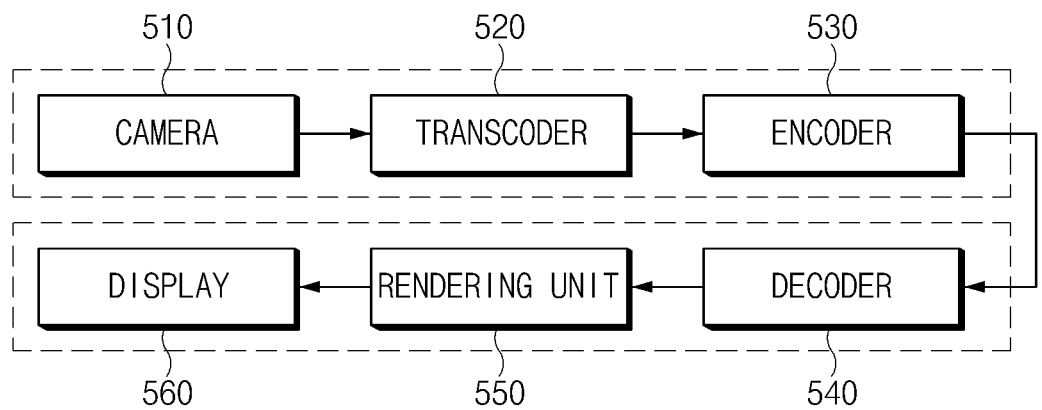
FIG. 5 is a diagram of an image processing system for generating and reproducing 3D contents, according an embodiment of the present disclosure.

FIG. 5 is a diagram of an image processing system for generating and reproducing 3D contents, according to an embodiment of the present disclosure.

In an image processing system 500, 3D contents (e.g., a 360-degree image) may be sequentially processed by a camera 510, a transcoder 520, an encoder 530, a decoder 540, a rendering unit 550, and a display 560.

The camera 510, the transcoder 520, and the encoder 530 may be included in a transmitter, and the decoder 540, the rendering unit 550, and the display 560 may be included in a receiver. As illustrated in FIG. 3, the transmitter and the receiver may be implemented with the contents generation device 10 and the electronic device 100, respectively. The camera 510, the transcoder 520, and the encoder 530 may correspond to hardware elements of the contents generation device 10. Furthermore, the decoder 540, the rendering unit 550, and the display 560 may correspond to hardware elements of the electronic device 100.

Although the aforementioned image processing system 500 is divided into the transmitter and the receiver for the convenience of description, the elements of the image processing system 500 may all be included in a single device, or may be included in another device in various combinations. For example, the electronic device 100 may include all the elements of the image processing system 500 therein.

The camera 510 may take an omni-directional image. Assuming that the camera 510 includes a pair of fisheye lenses having an angle of view of 180 degrees or more, the camera 510 may take the omni-directional image by using the pair of fisheye lenses. The camera 510 may transmit to the transcoder 520 two images taken by using the pair of fisheye lenses. When the camera 510 includes a plurality of cameras, the plurality of cameras 510 may photograph spaces directed toward different directions. The plurality of cameras 510 may transmit a plurality of images taken in different directions to the transcoder 520 individually or by combining the plurality of images into a single two-dimensional (2D) image. Although the images to be processed in the image processing system 500 are illustrated as being taken by the camera 510 in the above-described examples, the present disclosure is not limited thereto. That is, the images to be processed in the image processing system 500 may be virtual images (e.g., game images or animation images viewed from virtual camera viewpoints based on a virtual space). Furthermore, although the images to be processed in the image processing system 500 are illustrated as omni-directional images in the above-described examples, the images may be images obtained by photographing a space directed toward one direction or spaces directed toward a plurality of directions. For example, the image processing system 500 may also process an image taken by using one of the pair of fisheye lenses.

The transcoder 520 may map an omni-directional image into a 2D image. The transcoder 520 may map the two images taken by using the fisheye lenses onto a 3D space (coordinates) as a 3D image and then may map the 3D image onto a 2D space (coordinates) as a 2D image. To map an omni-directional image into a 3D image, the transcoder 520 may map the omni-directional image onto an outer or inner surface of a 3D virtual model.

The transcoder 520 may map an omni-directional image into a 2D image and may generate metadata on a coordinate relationship between the 3D image and the mapped 2D image at the same time as mapping the 3D image into the 2D image.

The encoder 530 may encode a 2D image transmitted from the transcoder 520. The encoder 530 may perform the encoding based on a codec standard, such as H.264, moving pictures experts group (MPEG)-4, high efficiency video coding (HEVC), or the like.

Here, the encoder 530 may store the encoded image data of the 2D image in a video or still image format in a memory. Furthermore, the image data encoded by the encoder 530 may be transmitted to the electronic device 100 in a streaming or file format. The stored or transmitted encoded image data may be transmitted to the decoder 540.

The decoder 540 may decode the encoded image data transmitted from the encoder 530. The decoder 540 may perform the decoding by using the same codec standard (e.g., H.264, MPEG-4, HEVC, or the like) as the codec standard used by the encoder 530 to encode the mapped 2D image.

The rendering unit 550 may perform rendering based on the decoded 2D image (hereinafter, the input frame). In this case, the rendering unit 550 may additionally use metadata for the rendering. The metadata may be generated in the transmitter and then transmitted to the receiver, or may have been stored in a storage unit of the receiver in advance. The metadata may be included in an exif field of joint photographic experts group (JPEG) when an image frame is encoded by using JPEG in the transmitter, and may be included in a moov field of MPEG-4 when an image frame is compressed by using MPEG-4 in the transmitter. Furthermore, the metadata may be included in an end portion of the image frame. The metadata mentioned in FIG. 5 may be metadata used for combining and rendering images, but may not be FOV information for generating a thumbnail.

The display 560 may display a rendered output frame. The display 560 may correspond to the display 160 of FIG. 1.

FIG. 6 is a diagram of a 3D space, according to an embodiment of the present disclosure.

The 3D space 601 may be implemented by the HMD device 200. Specifically, the electronic device 100 may generate a left-eye image and a right-eye image based on the first content, and a user that views the left-eye image and the right-eye image through lenses of the HMD device 200 may recognize a 3D virtual space. The 3D space 601 may be implemented by texture-mapping a wide-angle image/video onto a preset 3D model 610 (e.g., a sphere having a preset radius R, a cube, or a cylinder) and by locating the user's viewpoint (or a virtual camera) inside the 3D model (e.g., at a center point 615 of the sphere or at a position a predetermined distance rearward from the center point 615 in a direction opposite to the gaze direction).

The electronic device 100 may render (e.g., visualize) a first partial image 631 (or a first screen) corresponding to a first area of the 3D space 601 according to a first gaze 621 and may display the rendered first partial image 631 on a display. The first partial image 631 may include an area that is the same as or larger than an FOV corresponding to the first gaze 621.

In response to a selection of a view mode or an input for changing a viewpoint, the electronic device 100 may render a second partial image 634 (or a second screen) corresponding to a second are of the 3D space 601 and may display the rendered second partial image 634 on the display. The second partial image 634 may include an area that is greater than or equal to an FOV corresponding to a second gaze 640.

Camera/user view (or a rendering view port or a rendering area) in the 3D space 601 may be controlled by a horizontal component 651 and a vertical component 652 of the FOV. A 3D contents reproduction application (or a virtual reality application) may control an FOV by configuring planes (e.g. right, left, top, bottom, near, and far planes) that limit and define a rendering view port.

If the first content is completely reproduced when the user views the first partial image 631 corresponding to the first gaze 621, the electronic device 100 may store the first partial image 631 as a thumbnail of the first content. If the first content is completely reproduced when the user views the second partial image 634 corresponding to the second gaze 640, the electronic device 100 may store the second partial image 634 as a thumbnail of the first content.

The FOV may be defined by absolute coordinate values in a 3D coordinate system. The FOV may be defined by coordinate values $(r, \theta, \varphi)$ in a spherical coordinate system. The FOV defined by the coordinate values $(r, \theta, \varphi)$ may be corrected into a 2D plane and may be stored as a thumbnail. A correction algorithm may be provided in an API form through a developer tool, or a separate 3D-2D correction algorithm may be additionally or alternatively used.

The electronic device 100 may generate a thumbnail appropriate for each application by using an image that has already been rendered. The electronic device 100 may store coordinate values to refer to the same during reproduction, or may store information about a movement of a gaze relative to a starting point to extract coordinate values.

A thumbnail of the first content may be separate image data generated based on FOV information. The electronic device 100 may store the first content and the thumbnail of the first content in the memory 130 of the electronic device 100 and may map a correspondence relation therebetween. The electronic device 100, when displaying the thumbnail of the first content in a photo application, may import the thumbnail of the first content that has been mapped onto the first content.

The first content may include FOV information for generating a thumbnail as metadata. When displaying a thumbnail of the first content in a photo application, the electronic device 100 may identify the FOV information from the metadata of the first content and may determine, as the thumbnail, a screen corresponding to an area determined on the basis of the FOV information when the first content are implemented in the 3D virtual space.

The two embodiments described above may not be mutually exclusive and may be appropriately used. For example, after determining the screen corresponding to the area determined on the basis of the FOV information as the thumbnail, the electronic device 100 may store the thumbnail and may map a correspondence relation.

The electronic device 100 may capture an area corresponding to the FOV in the 3D virtual space and may then store the captured area as a thumbnail. Since the captured thumbnail corresponds to the 3D space, when the captured thumbnail is displayed in 2D, distortion may occur in an edge portion of the image. The electronic device 100 may generate the thumbnail by correcting the distortion, or may generate the thumbnail without correction.

The electronic device 100 may generate a thumbnail cache by decoding an original image (e.g., an FOV) by using an application or a decoder provided in the electronic device 100, and may store the thumbnail cache in the memory 130. The electronic device 100 may generate the thumbnail cache in a plurality of sizes to support views of various sizes. Furthermore, when generating a thumbnail cache, the electronic device 100 may link and store a key value for identifying original contents (e.g., the path along which the contents have been stored and/or the date when the contents have been generated) and a decoded thumbnail. Accordingly, the electronic device 100 may determine whether the thumbnail cache of the corresponding contents exists, based on the key value.

Figure 7A:
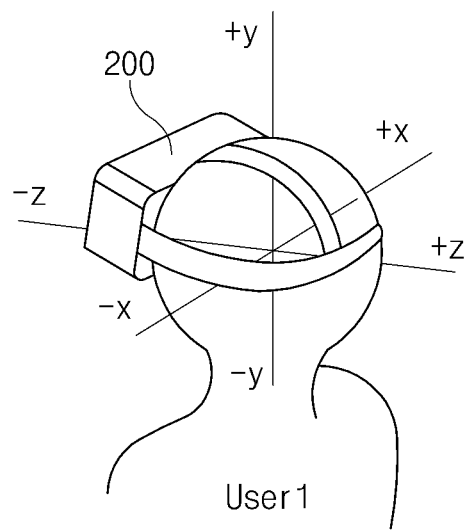
FIG. 7A is a diagram of a method of obtaining FOV information depending on a movement of a user having an HMD device worn on their head, according an embodiment of the present disclosure.

FIG. 7A is a diagram of a method of obtaining FOV information depending on a movement of a user having an HMD device worn on their head, according to an embodiment of the present disclosure.

The user 1 may move in x, y, or z direction, with the HMD device 200 worn on their head. A plane (e.g., a far plane) of an FOV may be varied depending on the movement of the user 1. If the user 1 facing the −z direction moves in the −z direction with the HMD device 200 worn on their head, the distance from the center point of a 3D space to the far plane may decrease identically or by a predetermined rate. Through a user input on a control panel of the HMD device 200, the user 1 may move a character corresponding to the user 1 or the subject of a gaze in the 3D space. The distance from the center point of the 3D space to the far plane may be changed in response to the user input on the control panel. FOV information may include information about the gaze direction of the user 1, the distance by which the user 1 moves in the gaze direction, and the distance to the far plane corresponding to the gaze direction.

The HMD device 200 may adjust the FOV in consideration of only rotation of the HMD device 200, which will be described below with reference to FIG. 7B, without considering a movement of the HMD device 200.

Figure 7B:
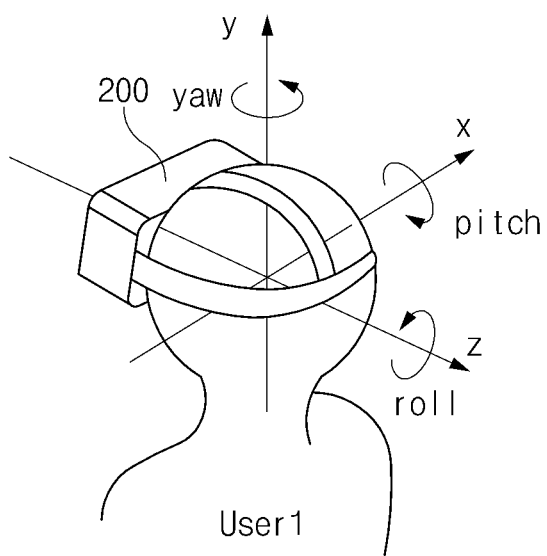
FIG. 7B is a diagram of a method of obtaining FOV information depending on rotation of a user having an HMD device worn on their head, according an embodiment of the present disclosure.

FIG. 7B is a diagram of a method of obtaining FOV information depending on rotation of a user having an HMD device worn on their head, according to an embodiment of the present disclosure.

The HMD device 200 may obtain information relating to rotation of the user 1. The HMD device 200 may obtain information about a first rotation angle (pitch) about the x axis, a second rotation angle (yaw) about the y axis, and a third rotation angle (roll) about the z axis, by using a sensor included in the HMD device 200. FOV information may include information about the rotation angles of the user 1 relative to a reference direction. If the electronic device 100 obtains the information about the rotation angles from the HMD device 200, the electronic device 100 may determine an FOV based on the rotation information. For example, even though the gaze of the user 1 is directed toward the −z direction, the FOV may correspond to different areas (overlapping each other) according to the magnitude of the third rotation angle.

Figure 8:
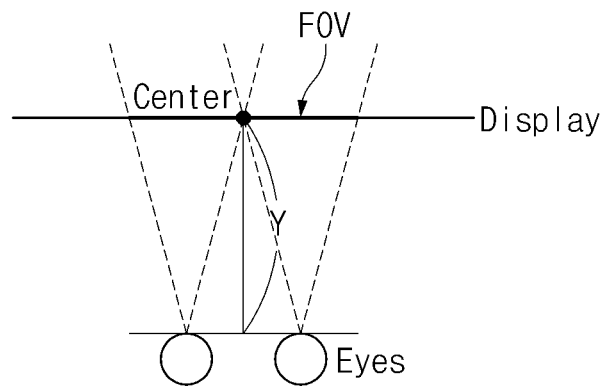
FIG. 8 is a diagram of FOV information stored in metadata, according an embodiment of the present disclosure.

FIG. 8 is a diagram of FOV information stored in metadata, according to an embodiment of the present disclosure.

The HMD device 200 may determine a gaze distance Y from points where the eyes of the user 1 are located to a display plane of a 3D virtual space. The gaze distance Y may be replaced with the distance zFar to the far plane or the distance (zFar−zNear) between the far plane and the near plane. Furthermore, the gaze distance Y may be changed depending on a movement of the user 1 as in FIG. 7A or under the control of the HMD device 200. The gaze distance Y may be fixed.

FOV information may include information about the gaze distance Y and the current location corresponding to the gaze direction. If a reference location when the first content start to be reproduced corresponds to first coordinates (e.g., Y, 0, 0), the current location corresponding to the gaze direction may correspond to second coordinates (e.g., Y, a, b). The current location may correspond to the center point of an FOV corresponding to the current gaze direction. The FOV information may be stored as metadata. The metadata may be stored together with the first content, or may be stored or synchronized as a separate file.

The electronic device 100 may determine an FOV based on the FOV information. When the electronic device 100 implements the first content in a 3D space, the electronic device 100 may determine an area corresponding to the FOV on the basis of the FOV information and may store this area (that is, the area corresponding to the FOV) as a thumbnail of the first content; however, the electronic device 100 may store a portion of the area corresponding to the FOV as a thumbnail of the first content.

Figure 9:
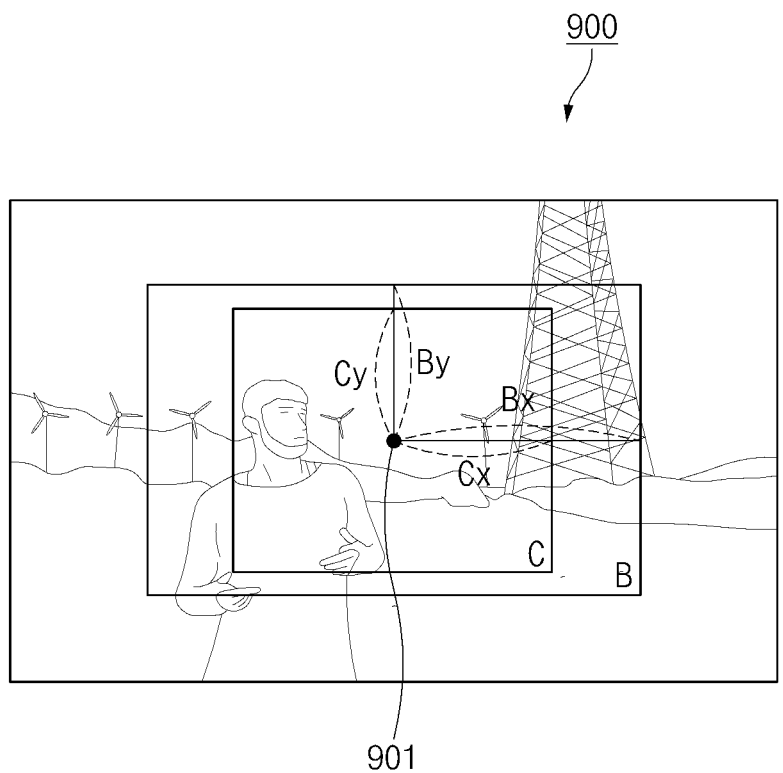
FIG. 9 is a diagram of generating a thumbnail based on the FOV information, according an embodiment of the present disclosure.

FIG. 9 is a diagram of generating a thumbnail based on FOV information, according to an embodiment of the present disclosure.

A screen 900 may correspond to an FOV of the first content determined based on the FOV information. The electronic device 100 may define the entire area corresponding to the FOV as a thumbnail of the first content.

The electronic device 100 may obtain a reference point of the FOV from the FOV information. The electronic device 100 may obtain coordinate information of a reference point 901 of the screen 900. The electronic device 100 may determine the size of a thumbnail based on the reference point. With respect to a gallery application that provides thumbnails for a plurality of images, areas for displaying the thumbnails may have been defined in advance. With respect to a photo application that displays a thumbnail in a pixel area of 200*200, the electronic device 100 may generate an area corresponding to 200*200 pixels with respect to the reference point 901 on the screen 900, which corresponds to the FOV, as a thumbnail. The electronic device 100 may generate an area corresponding to 200n*200n pixels with respect to the reference point 901 as a thumbnail; "n" may correspond to an appropriate value larger than 1.

When the electronic device 100 uploads the first content to the social network service 12 or the video streaming service 13, a thumbnail may be generated based on the resolution of a preview shown in a web page or an application that corresponds to the relevant service. When the social network service 12 supports a preview having a resolution of 320*240 for the uploaded contents, the electronic device 100 may generate an area corresponding to 320*240 with respect to the reference point 901 as a thumbnail, or may generate a thumbnail having a horizontal to vertical ratio of 3:2. In other words, the electronic device 100, may generate the FOV screen 900 as a thumbnail, or may generate a partial area of the screen 900 as a thumbnail according to characteristics of an application/service. Area B may be generated as a thumbnail for an application in which a horizontal to vertical ratio of Bx:By is appropriate, and area C may be generated as a thumbnail for an application in which a horizontal to vertical ratio of Cx:Cy is appropriate.

Figure 10:
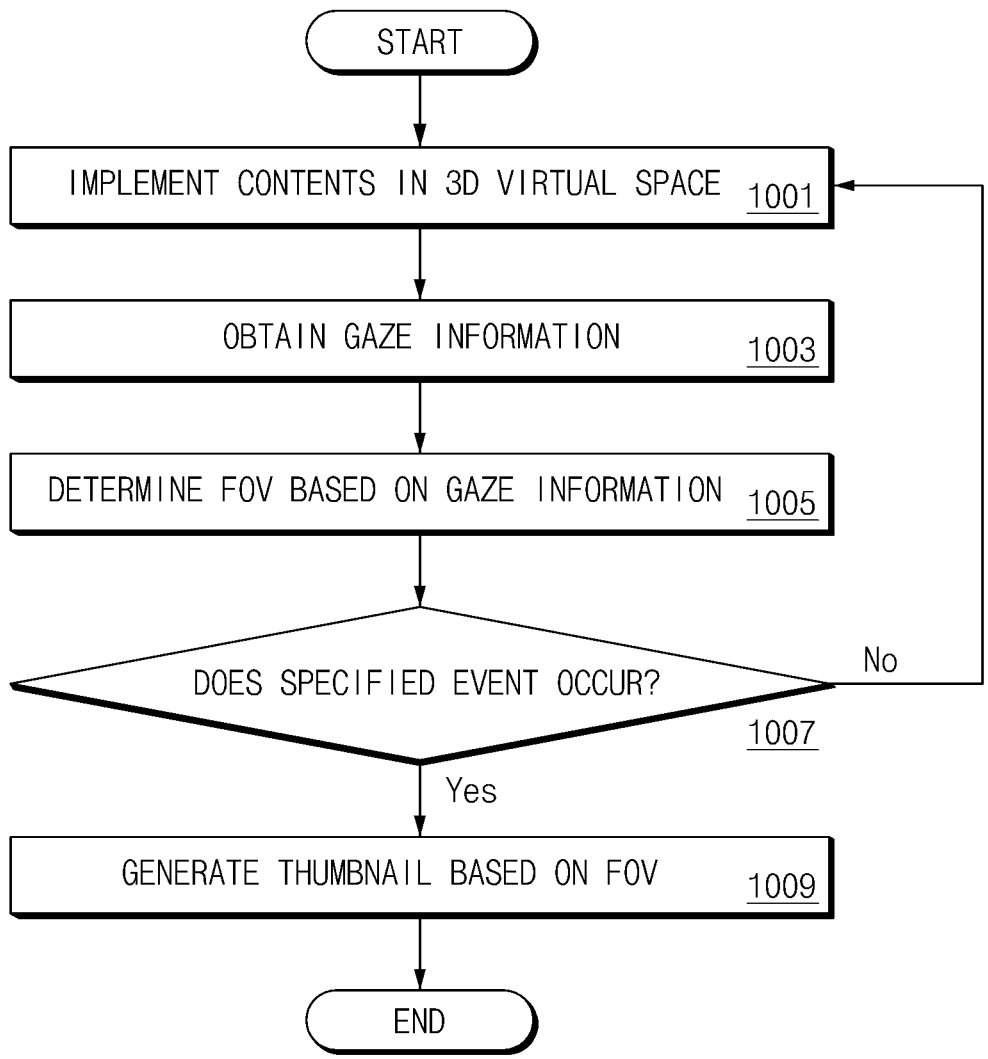
FIG. 10 is a flowchart of a method of generating a thumbnail of contents, according an embodiment of the present disclosure.

FIG. 10 is a flowchart of a method of generating a thumbnail of contents, according to an embodiment of the present disclosure.

In operation 1001, the electronic device 100 may implement 3D contents in a 3D virtual space. The electronic device 100 may implement VR contents in the 3D virtual space through the HMD device 200a.

Implementing the contents in the 3D space in operation 1001 may include the following meanings: displaying a 3D image in the 3D space, reproducing 3D video contents in the 3D space, and rendering objects included in 3D virtual reality to the 3D virtual space.

Furthermore, the electronic device 100 may implement the first content in the 3D space in response to occurrence of a pre-defined event. The electronic device 100 may implement the first content in the 3D space when the electronic device 100 recognizes a combination with the HMD device 200a, or an input for selecting the first content or a thumbnail of the first content occurs after the combination is recognized.

In operation 1003, the electronic device 100 may obtain gaze information. The electronic device 100 may obtain gaze information at the time when the first content starts to be reproduced. When the first content starts to be reproduced, the gaze information may have been defined in advance as any point of the first content (e.g., a central region of the first content). In this state, the electronic device 100 may obtain the gaze information based on a control instruction and a movement of the electronic device 100 and/or a movement of the HMD device 200a to which the electronic device 100 is coupled. The electronic device 100 may obtain information about a movement or rotation of the HMD device 200a, a change of settings through a user input, and the like.

In operation 1005, the electronic device 100 may determine an FOV based on the gaze information. The electronic device 100 may determine the direction toward which the user's gaze is currently directed, and may determine the FOV on the basis of the determined direction, the horizontal angle range of the FOV, the vertical angle range of the FOV, and/or the distance to the far plane. The reference point of FIG. 9 may be determined based on the determined direction, and the screen 900 of FIG. 9 may be determined based on the distance to the far plane and the angle ranges.

The electronic device 100 may continue to render the area of the first content that corresponds to the FOV, with the first content implemented in the 3D space. Since the area corresponding to the FOV is changed every time the user's gaze direction is changed, the electronic device 100 may continue to render an area including the FOV and larger than the FOV by a predetermined range, as the concept of a buffer. If a specified event occurs in this state as in operation 1007, the electronic device 100 may generate a thumbnail based on the FOV, or may store the FOV information as metadata. If the first content is completely reproduced (that is, if an event for ending the reproduction occurs), the electronic device 100 may store, in the memory 130, at least a portion of an area corresponding to the FOV at the end time (that is, the last FOV) as a thumbnail of the first content.

The first content may be 3D video contents. An image to be rendered to the FOV may be determined on the basis of information about reproduction time, in addition to gaze information. Even though the user faces the same direction, a different image may be rendered to the FOV as time passes. Accordingly, the electronic device 100 may store, in metadata, reproduction time (e.g., presentation time stamp (PTS)) information of the first content at the time when a specified event (e.g., an end event) occurs, as a portion of the FOV information or together with the FOV information.

The electronic device 100 may perform the following operations in response to the specified event. The electronic device 100 may generate a thumbnail based on the FOV at the time when the specified event occurred and may map the generated thumbnail with the first content. Alternatively, the electronic device 100 may store the FOV information at the time when the event occurred, as metadata of the first content. The electronic device 100 may generate a thumbnail based on the FOV information at the time when the event occurred, may map the thumbnail with the first content, and may store the FOV information as metadata of the first content. The electronic device 100 may store the FOV information at the time when the event occurred in the memory 130 as metadata, and may map the stored metadata with the first content. If the first content is a video content, PTS information at the time when the event occurred may be stored as a portion of the FOV information or as metadata together with the FOV information. The FOV information (and the PTS information) may be used when the first content is reproduced again, or when the first content is reproduced by another user after shared.

Figure 11:
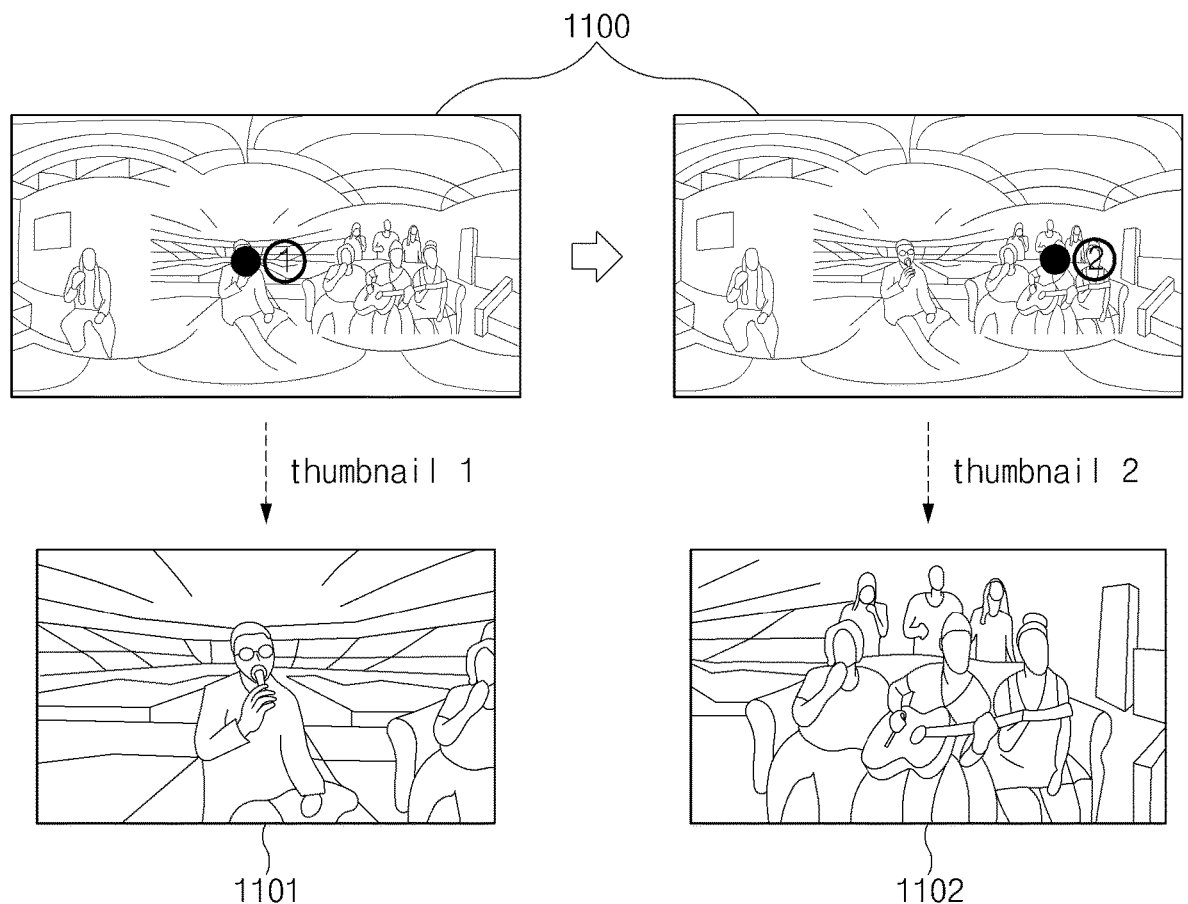
FIG. 11 is a diagram of a thumbnail generated based on gaze information, according an embodiment of the present disclosure.

FIG. 11 is a diagram of a thumbnail generated based on gaze information, according to an embodiment of the present disclosure.

When 3D contents are captured, a default reference point (e.g., an FOV when the contents are reproduced for the first time) may be set for the captured contents. A thumbnail may be generated based on an area, such as the front or the center point, which is shown on a screen when the contents are first reproduced. That is, the contents generation device 10 may set a reference FOV when generating 3D contents and may generate a thumbnail of the 3D contents based on the reference FOV. A user may select the contents, or may identify contents information, through the thumbnail. If the user selects the thumbnail to reproduce the contents through the HMD device 200, an FOV may be newly generated according to the user's motion (e.g., a movement of the HMD device 200) during the reproduction. Accordingly, the reference point may be changed, and the thumbnail may be updated based on the changed reference point.

If a reference point corresponds to point ① when 3D contents 1100 are generated, thumbnail 1 1101 may be displayed in a contents list as a thumbnail of the 3D contents 1100. After the user selects the 3D contents 1100 in the list, and the 3D contents 1100 are reproduced in a 3D virtual space, the reference point of the FOV at the time when the reproduction is completed may correspond to point ②. A thumbnail 2 1102 may be displayed in the contents list as a thumbnail of the 3D contents 1100.

Accordingly, by viewing only the thumbnail in the contents list (e.g., gallery), the user may know the point where the user has stopped watching the contents, and thus it is easy to use the contents.

Figure 12:
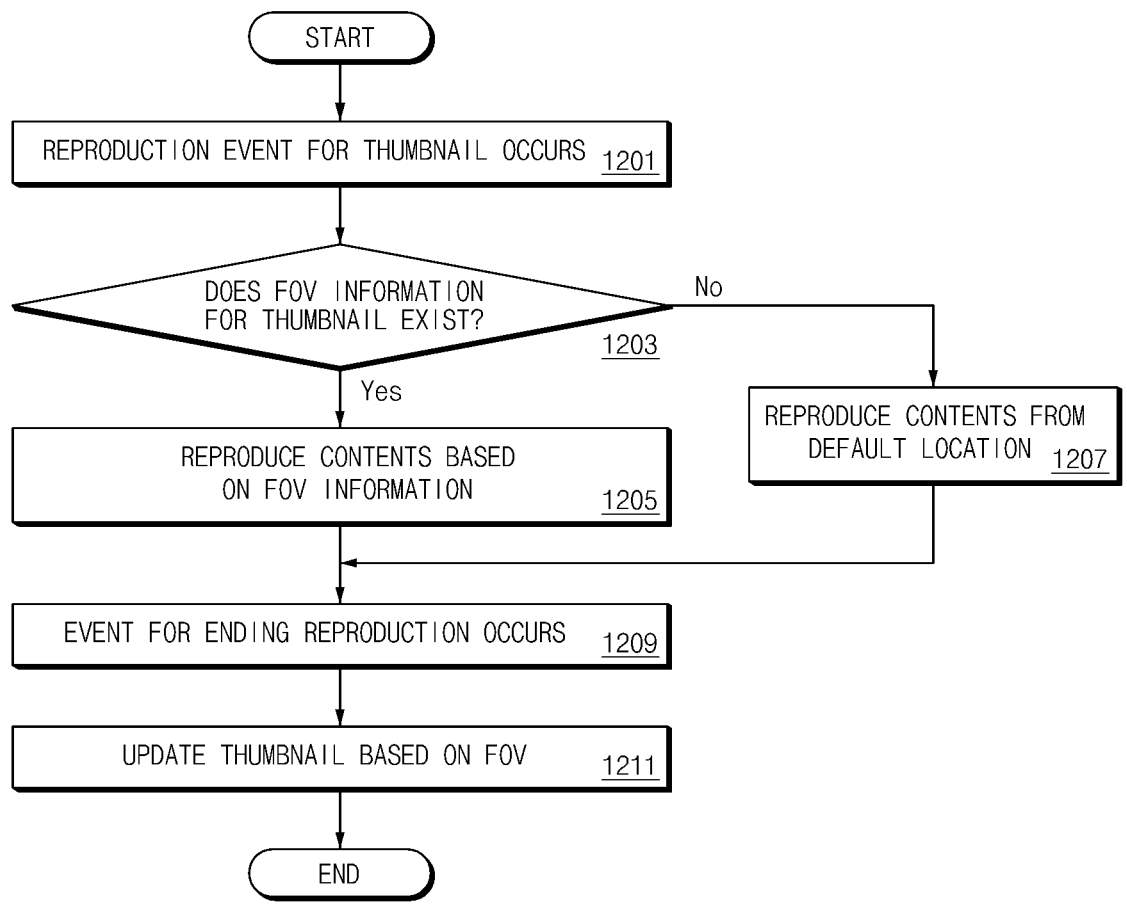
FIG. 12 is a flowchart of a method of using FOV information, according an embodiment of the present disclosure.

FIG. 12 is a flowchart of a method of using FOV information, according to an embodiment of the present disclosure.

In operation 1201, a reproduction event for a thumbnail may occur. The electronic device 100 may display a contents list including a thumbnail of the first content on the display 160 of the electronic device 100 and may execute the first content in response to a selection of the thumbnail of the first content. The execution of the first content may be the reproduction of the first content in the 3D virtual space, which has been described above with reference to FIG. 10. In other words, the reproduction event in operation 1201 may be an event in which the first content are executed again after the reproduction of the first content is completed according to the method of FIG. 10; however, the reproduction event in operation 1201 may correspond to a reproduction event for any 3D contents, which is independent of method of FIG. 10. Furthermore, the thumbnail of the first content may correspond to the thumbnail generated based on the FOV at the time when the reproduction is completed in the method of FIG. 10. The contents list may be a list of 3D contents, but may include general 2D image/video contents.

In operation 1203, the electronic device 100 may determine whether FOV information associated with the thumbnail exists. The electronic device 100 may determine whether the reproduction event in operation 1201 occurs for the first content that have the FOV information included in the metadata through the method of FIG. 10 or for the second content that do not have the FOV information as metadata. If the metadata of the first content includes FOV information, the electronic device 100 may, in operation 1205, start to reproduce the first content based on the FOV information. In other words, the electronic device 100 may reproduce the first content again from the last FOV of the previous reproduction.

If the metadata of the first content, however, does not include FOV information, the electronic device 100 may, in operation 1207, reproduce the first content from the default location. The default location may correspond to an FOV defined to be displayed when the contents are first reproduced.

In operation 1209, an event for ending the reproduction may occur. In operation 1211, the electronic device 100 may update the thumbnail based on the FOV at the time when the reproduction is completed. When FOV information at the previous reproduction end time is already included in the metadata, the electronic device 100 may update the metadata by using FOV information at the latest end time. Furthermore, the electronic device 100 may update the thumbnail to be displayed in various types of contents lists or previews, based on the updated FOV information.

FOV information may be obtained through the HMD device 200. The electronic device 100 may implement the 3D space through the HMD device 200, may obtain a user's gaze information from the HMD device 200 based on a movement of the user that has the HMD device 200 on, and may determine an FOV on the basis of the obtained gaze information.

The electronic device 100 may determine an area of the 3D space that corresponds to the FOV, by using a user input to the electronic device 100 or a gyro sensor of the electronic device 100. An omni-directional image, such as a 360-degree image, may be displayed on the display 160 of the electronic device 100. Since the omni-directional image includes images in all directions with respect to a photographing center, only a portion of the entire area may be displayed in the case where the omni-directional image is displayed on the display 160 of the electronic device 100 as a 2D image. The user may change the displayed area by using a touch input or an electronic-pen input, or by changing the location or direction of the electronic device 100 (e.g., a direction that the display 160, exposed through the housing of the electronic device 100, faces). The area shown on the display 160 may correspond to the FOV. Accordingly, information about the area at the time when the reproduction (display) of 3D contents on the display 160 stops may be stored in metadata of the 3D contents as FOV information. As described above, the user may set a preferred area of the 3D contents to be displayed on the display 160 and then may end the reproduction of the 3D contents to generate/update a preferred thumbnail.

Furthermore, in the case of a 360-degree image, it is difficult to emphasize or highlight a specific portion since the entire space around a photographer is photographed. When a first user takes a photo of a store by using the contents generation device 10 and then sends the picture of the store to a second user, it is almost impossible to emphasize a specific portion. The first user has to take a photo of the corresponding portion with the existing photographing device and then separately send the photo of the portion to the second user, or has to send the second user a message together with the photo of the store to inform the second user of a portion that the second user has to look closely at. In accordance with the present disclosure, however, if the first user stores an important portion to be shared as an FOV, another user that receives the corresponding 360-degree image may comprehend the contents, focusing on the corresponding portion. If the second user also stores a portion that the second user wants to emphasize or mention as an FOV after watching (reproducing) the received contents, the first user may easily understand the portion important to the second user when the first user shares the contents again. Moreover, since only metadata is updated for the same contents, effects of rapid transmission and low data consumption may be achieved by transmitting only the metadata, except in the case of the first content sharing.

Moreover, even when a user shares 3D contents through the social network service 12 or the video streaming service 13, if the user posts the 3D contents after setting an FOV for a portion that the user wants to display, other users that watch a thumbnail (e.g., a preview) prior to contents may also watch the 3D contents, focusing on the corresponding portion (the FOV). In addition, when the other users re-share (e.g., clip, re-tweet, or the like) the corresponding posting, the corresponding contents may also be posted based on the FOV information of a user that re-shares the corresponding contents. A second user may be interested in a thumbnail (e.g., a screen A) of 3D contents uploaded by a first user to the specific social network service 12 and may desire to share the 3D contents on another screen (e.g., a screen B) with other users while watching the 3D contents. If a share menu (e.g., clip, re-tweet, share, or the like) is selected, the electronic device 100 may perceive the time when the share menu is selected as the time when a specified event occurs, and the 3D contents may be shared based on the FOV corresponding to the screen B.

Figure 13:
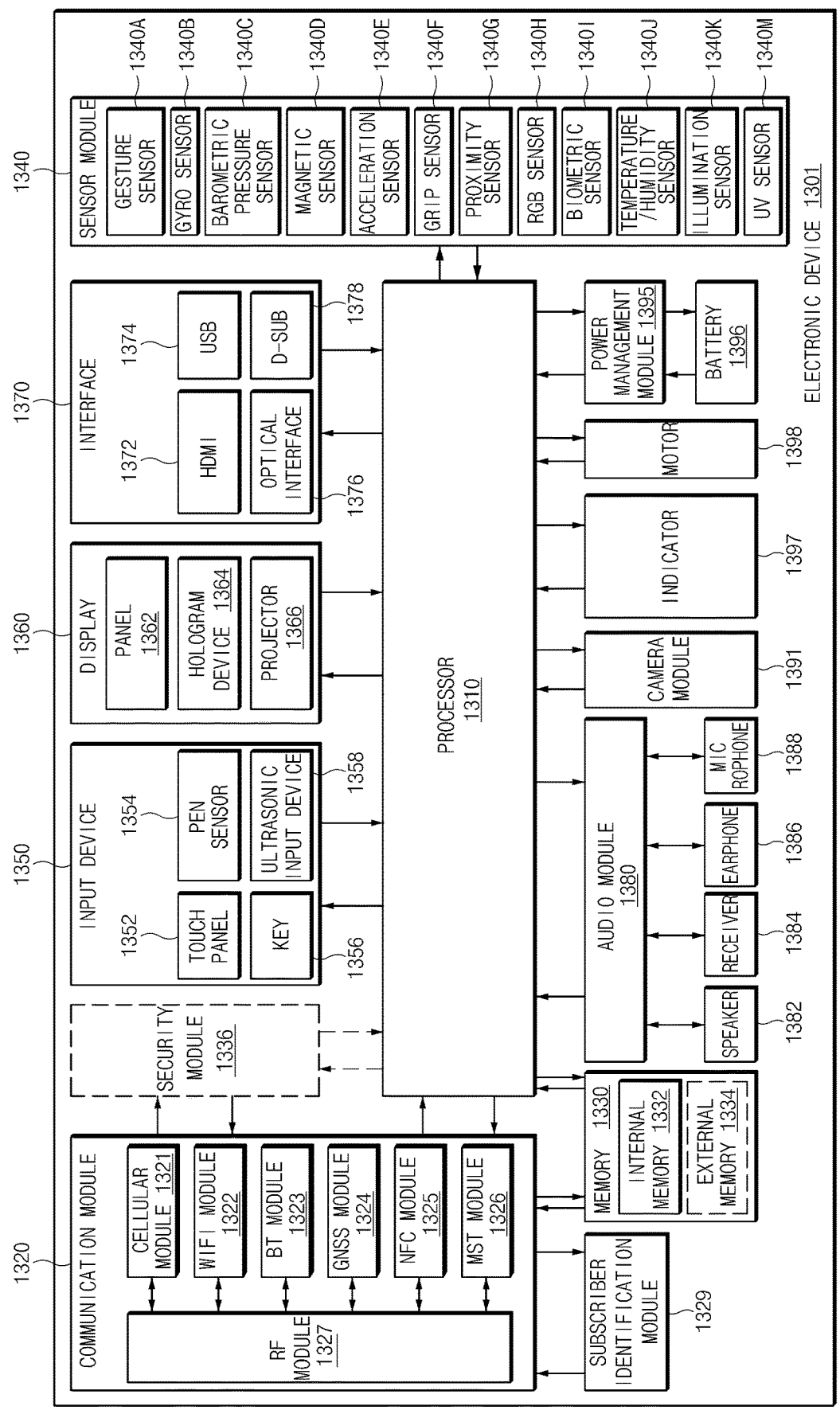
FIG. 13 is a diagram of an electronic device, according an embodiment of the present disclosure.

FIG. 13 is a diagram of an electronic device, according to an embodiment of the present disclosure.

An electronic device 1301 may include all or a part of the electronic device 100 illustrated in FIG. 1. The electronic device 1301 may include one or more processors (e.g., an application processor (AP)) 1310, a communication module 1320, a subscriber identification module (SIM) 1329, a memory 1330, a sensor module 1340, an input device 1350, a display 1360, an interface 1370, an audio module 1380, a camera module 1391, a power management module 1395, a battery 1396, an indicator 1397, and a motor 1398.

The processor 1310 may drive an OS or an application to control a plurality of hardware or software elements connected to the processor 1310 and may process and compute a variety of data. The processor 1310 may be implemented with a system on chip (SoC). The processor 1310 may further include a graphic processing unit (GPU) and/or an image signal processor. The processor 1310 may include at least a part (e.g., a cellular module 1321) of elements illustrated in FIG. 13. The processor 1310 may load an instruction or data, which is received from at least one of other elements (e.g., a nonvolatile memory), into a volatile memory and process the loaded instruction or data. The processor 1310 may store a variety of data in the nonvolatile memory.

The communication module 1320 may be configured the same as or similar to the communication interface 170 of FIG. 1. The communication module 1320 may include the cellular module 1321, a Wi-Fi module 1322, a BT module 1323, a GNSS module 1324 (e.g., a GPS module, a Glonass module, a Beidou module, or a Galileo module), an NFC module 1325, a MST module 1326 and a radio frequency (RF) module 1327.

The cellular module 1321 may provide voice communication, video communication, a character service, an Internet service, or the like over a communication network. The cellular module 1321 may perform discrimination and authentication of the electronic device 1301 within a communication network by using the SIM card 1329. The cellular module 1321 may perform at least a portion of functions that the processor 1310 provides. The cellular module 1321 may include a CP.

Each of the Wi-Fi module 1322, the BT module 1323, the GNSS module 1324, the NFC module 1325, or the MST module 1326 may include a processor for processing data exchanged through a corresponding module, for example. At least a part (e.g., two or more) of the cellular module 1321, the Wi-Fi module 1322, the BT module 1323, the GNSS module 1324, the NFC module 1325, or the MST module 1326 may be included within one integrated circuit (IC) or an IC package.

The RF module 1327 may transmit and receive a communication signal (e.g., an RF signal). The RF module 1327 may include a transceiver, a power amplifier module (PAM), a frequency filter, a low noise amplifier (LNA), an antenna, or the like. At least one of the cellular module 1321, the Wi-Fi module 1322, the BT module 1323, the GNSS module 1324, the NFC module 1325, or the MST module 1326 may transmit and receive an RF signal through a separate RF module.

The SIM 1329 may be an embedded SIM and may include unique identify information (e.g., integrated circuit card identifier (ICCID)) or subscriber information (e.g., international mobile subscriber identity (IMSI)).

The memory 1330 may include an internal memory 1332 or an external memory 1334. The internal memory 1332 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 1334 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 1334 may be operatively and/or physically connected to the electronic device 1301 through various interfaces.

A security module 1336 may be a module that includes a storage space of which a security level is higher than that of the memory 1330 and may be a circuit that guarantees safe data storage and a protected execution environment. The security module 1336 may be implemented with a separate circuit and may include a separate processor. For example, the security module 1336 may be in a smart chip or a secure digital (SD) card, which is removable, or may include an embedded secure element (eSE) embedded in a fixed chip of the electronic device 1301. Furthermore, the security module 1336 may operate based on an OS that is different from the OS of the electronic device 1301. The security module 1336 may operate based on Java card open platform (JCOP) OS.

The sensor module 1340 may measure a physical quantity or may detect an operation state of the electronic device 1301. The sensor module 1340 may convert the measured or detected information to an electric signal. the sensor module 1340 may include at least one of a gesture sensor 1340A, a gyro sensor 1340B, a barometric pressure sensor 1340C, a magnetic sensor 1340D, an acceleration sensor 1340E, a grip sensor 1340F, the proximity sensor 1340G, a color sensor 1340H (e.g., red, green, blue (RGB) sensor), a biometric sensor 1340I, a temperature/humidity sensor 1340J, an illuminance sensor 1340K, or an UV sensor 1340M. Although not illustrated, additionally or generally, the sensor module 1340 may further include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1340 may further include a control circuit for controlling at least one or more sensors included therein. The electronic device 1301 may further include a processor that is a part of the processor 1310 or independent of the processor 1310 and is configured to control the sensor module 1340. The processor may control the sensor module 1340 while the processor 1310 remains in a sleep state.

The input device 1350 may include a touch panel 1352, a (digital) pen sensor 1354, a key 1356, or an ultrasonic input unit 1358. The touch panel 1352 may use at least one of capacitive, resistive, infrared and ultrasonic detecting methods. Also, the touch panel 1352 may further include a control circuit. The touch panel 1352 may further include a tactile layer to provide a tactile reaction to a user.

The (digital) pen sensor 1354 may be a part of a touch panel or may include an additional sheet for recognition. The key 1356 may include a physical button, an optical key, or a keypad. The ultrasonic input device 1358 may detect (or sense) an ultrasonic signal, which is generated from an input device, through a microphone 1388 and may check data corresponding to the detected ultrasonic signal.

The display 1360 may include a panel 1362, a hologram device 1364, or a projector 1366. The panel 1362 may be the same as or similar to the display 160 illustrated in FIG. 1. The panel 1362 may be implemented to be flexible, transparent or wearable. The panel 1362 and the touch panel 1352 may be integrated into a single module. The hologram device 1364 may display a stereoscopic image in a space using a light interference phenomenon. The projector 1366 may project light onto a screen so as to display an image. The screen may be arranged in the inside or the outside of the electronic device 1301. The display 1360 may further include a control circuit for controlling the panel 1362, the hologram device 1364, or the projector 1366.

The interface 1370 may include an HDMI 1372, a USB 1374, an optical interface 1376, or a d-subminiature (D-sub) 1378. The interface 1370 may be included in the communication interface 170 illustrated in FIG. 1. Additionally or generally, the interface 1370 may include a mobile high definition link (MHL) interface, a SD card/multi-media card (MMC) interface, or an Infrared Data Association (IrDA) standard interface.

The audio module 1380 may convert a sound and an electric signal in dual directions. At least a part of the audio module 1380 may be included in the input/output interface 150 illustrated in FIG. 1. The audio module 1380 may process sound information that is input or output through a speaker 1382, a receiver 1384, an earphone 1386, or the microphone 1388.

The camera module 1391 may shoot a still image or a video. The camera module 1391 may include at least one or more image sensors (e.g., a front sensor or a rear sensor), a lens, an image signal processor (ISP), or a flash (e.g., an LED or a xenon lamp).

The power management module 1395 may manage power of the electronic device 1301. A power management integrated circuit (PMIC), a charger IC, or a battery gauge may be included in the power management module 1395. The PMIC may have a wired charging method and/or a wireless charging method. The wireless charging method may include a magnetic resonance method, a magnetic induction method or an electromagnetic method and may further include an additional circuit, for example, a coil loop, a resonant circuit, a rectifier, or the like. The battery gauge may measure a remaining capacity of the battery 1396 and a voltage, current or temperature thereof while the battery is charged. The battery 1396 may include a rechargeable battery and/or a solar battery.

The indicator 1397 may display a specific state of the electronic device 1301 or a part thereof (e.g., the processor 1310), such as a booting state, a message state, a charging state, and the like. The motor 1398 may convert an electrical signal into a mechanical vibration and may generate the following effects: vibration, haptic, and the like. A processing device (e.g., a GPU) for supporting a mobile TV may be included in the electronic device 1301. The processing device for supporting the mobile TV may process media data according to the standards of digital multimedia broadcasting (DMB), digital video broadcasting (DVB), MediaFLO™, or the like.

Each of the above-mentioned elements of the electronic device 1301 e may be configured with one or more components, and the names of the elements may be changed according to the type of the electronic device 1301. The electronic device 1301 may include at least one of the above-mentioned elements, and some elements may be omitted or other additional elements may be added. Furthermore, some of the elements of the electronic device 1301 may be combined with each other so as to form one entity, so that the functions of the elements may be performed in the same manner as before the combination.

Figure 14:
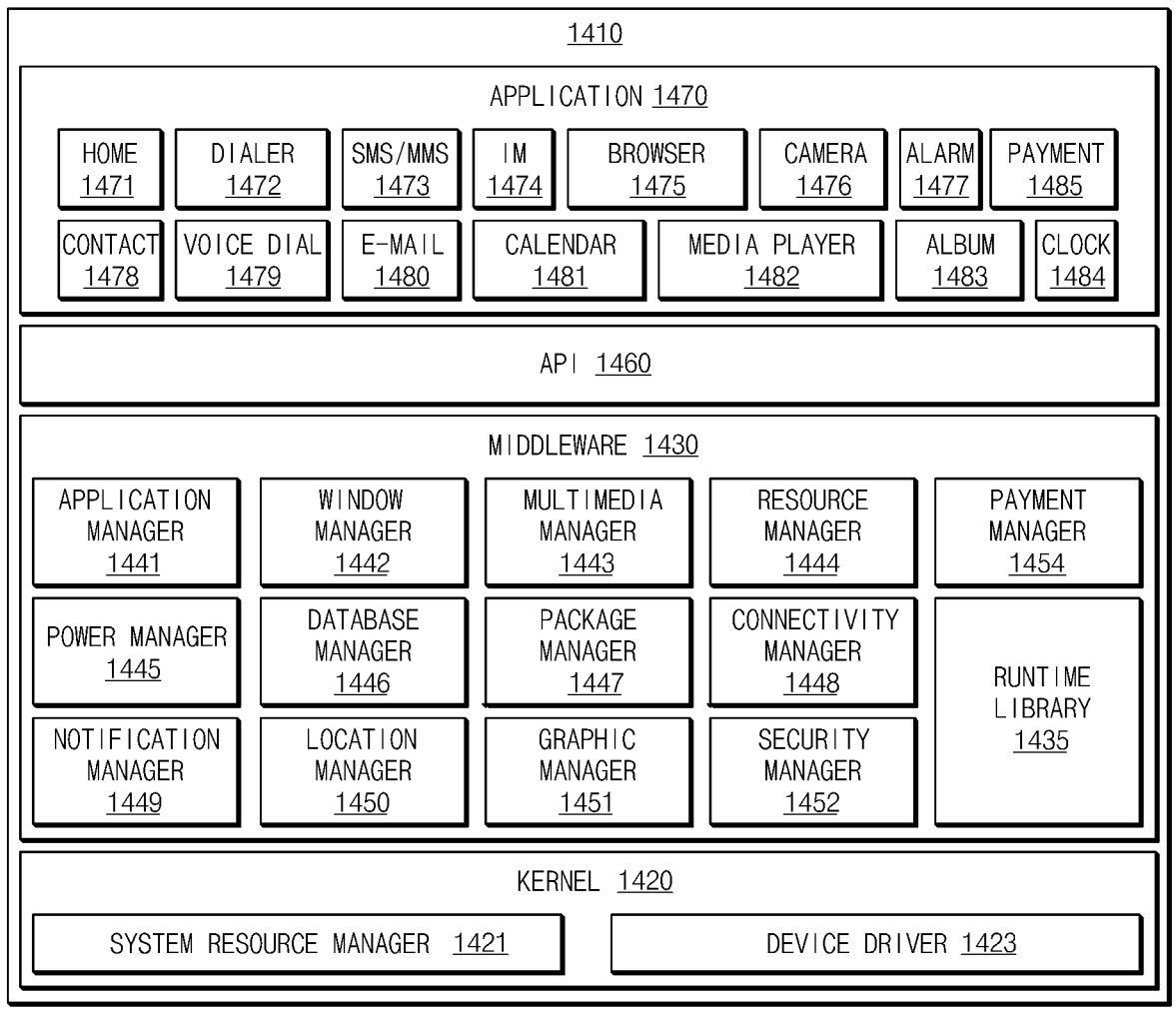
FIG. 14 is a diagram of a program module, according an embodiment of the present disclosure.

FIG. 14 illustrates a block diagram of a program module, according to various embodiments.

A program module 1410 may include an OS to control resources associated with an electronic device (e.g., the electronic device 100), and/or diverse applications (e.g., the application 147) driven on the OS. The OS may be Android™, iOS™, Windows™, Symbian™, or Tizen™.

The program module 1410 may include a kernel 1420, a middleware 1430, an API 1460, and/or an application 1470. At least a portion of the program module 1410 may be preloaded on an electronic device or may be downloadable from an external electronic device (e.g., the first electronic device 102, the second electronic device 104, the server 106, or the like).

The kernel 1420 may include a system resource manager 1421 or a device driver 1423. The system resource manager 1421 may control, allocate, or retrieve system resources. The system resource manager 1421 may include a process managing unit, a memory managing unit, a file system managing unit, or the like. The device driver 1423 may include a display driver, a camera driver, a BT driver, a shared memory driver, a USB driver, a keypad driver, a Wi-Fi driver, an audio driver, or an inter-process communication (IPC) driver.

The middleware 1430 may provide a function that the application 1470 needs in common, or may provide diverse functions to the application 1470 through the API 1460 to allow the application 1470 to efficiently use limited system resources of the electronic device. The middleware 1430 may include at least one of a runtime library 1435, an application manager 1441, a window manager 1442, a multimedia manager 1443, a resource manager 1444, a power manager 1445, a database manager 1446, a package manager 1447, a connectivity manager 1448, a notification manager 1449, a location manager 1450, a graphic manager 1451, a security manager 1452, or a payment manager 1454.

The runtime library 1435 may include a library module that is used by a compiler to add a new function through a programming language while the application 1470 is being executed. The runtime library 1435 may perform input/output management, memory management, or capacities about arithmetic functions.

The application manager 1441 may manage a life cycle of at least one application of the application 1470. The window manager 1442 may manage a GUI resource that is used in a screen. The multimedia manager 1443 may identify a format necessary for playing diverse media files, and may perform encoding or decoding of media files by using a codec suitable for the format. The resource manager 1444 may manage resources such as a storage space, memory, or source code of at least one application of the application 1470.

The power manager 1445 may operate with a basic input/output system (BIOS) to manage a battery or power, and may provide power information for an operation of an electronic device. The database manager 1446 may generate, search for, or modify database that is to be used in at least one application of the application 1470. The package manager 1447 may install or update an application that is distributed in the form of package file.

The connectivity manager 1448 may manage wireless connection such as Wi-Fi or BT. The notification manager 1449 may display or notify an event such as arrival message, appointment, or proximity notification in a mode that does not disturb a user. The location manager 1450 may manage location information about an electronic device. The graphic manager 1451 may manage a graphic effect that is provided to a user, or manage a user interface relevant thereto. The security manager 1452 may provide a general security function necessary for system security, user authentication, or the like. When an electronic device includes a telephony function, the middleware 1430 may further include a telephony manager for managing a voice or video call function of the electronic device.

The middleware 1430 may include a middleware module that combines diverse functions of the above-described elements. The middleware 1430 may provide a module specialized to each type of OS to provide differentiated functions. Additionally, the middleware 1430 may dynamically remove a part of the preexisting elements or may add new elements thereto.

The API 1460 may be a set of programming functions and may be provided with a configuration that is variable depending on the type of OS. When an OS is the Android™ or the iOS™, it may provide one API set per platform. In the case where an OS is the Tizen™, it may provide two or more API sets per platform.

The application 1470 may include, one or more applications capable of providing functions for a home application 1471, a dialer application 1472, an SMS/MMS application 1473, an instant message application (IM) 1474, a browser application 1475, a camera application 1476, an alarm application 1477, a contact application 1478, a voice dial application 1479, an e-mail application 1480, a calendar application 1481, a media player application 1482, an album application 1483, a timepiece application 1484, a payment application 1485, health care application (e.g., measuring an exercise quantity, blood glucose, or the like) or offering of environment information (e.g., information of barometric pressure, humidity, temperature, or the like).

The application 1470 may include an information exchanging application to support information exchange between an electronic device and an external electronic device. The information exchanging application may include a notification relay application for transmitting specific information to an external electronic device, or a device management application for managing the external electronic device.

The notification relay application may include a function of transmitting notification information, which arise from other applications (e.g., applications for SMS/MMS, e-mail, health care, or environmental information), to an external electronic device. Additionally, the notification relay application may receive notification information from an external electronic device and provide the notification information to a user.

The device management application may manage (e.g., install, delete, or update), at least one function (e.g., turn-on/turn-off of an external electronic device itself (or a part of components) or adjustment of brightness (or resolution) of a display) of the external electronic device which communicates with the electronic device, an application running in the external electronic device, or a service (e.g., a call service, a message service, or the like) provided from the external electronic device.

The application 1470 may include an application (e.g., a health care application of a mobile medical device) that is assigned in accordance with an attribute of an external electronic device. The application 1470 may include an application that is received from an external electronic device. The application 1470 may include a preloaded application or a third party application that is downloadable from a server. The names of elements of the program module 1410 according to the embodiment may be modifiable depending on kinds of operating systems.

At least a portion of the program module 1410 may be implemented by software, firmware, hardware, or a combination of two or more thereof. At least a portion of the program module 1410 may be implemented (e.g., executed), for example, by the processor (e.g., the processor 1310). At least a portion of the program module 1410 may include, for example, modules, programs, routines, sets of instructions, processes, or the like for performing one or more functions.

At least a part of an apparatus (e.g., modules or functions thereof) or a method (e.g., operations) may be implemented by instructions stored in non-transitory computer-readable storage media in the form of a program module. The instruction, when executed by a processor (e.g., the processor 120), may cause the one or more processors to perform a function corresponding to the instruction. The non-transitory computer-readable storage media, for example, may be the memory 130.

The non-transitory computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, a program instruction may include not only a mechanical code such as things generated by a compiler but also a high-level language code executable on a computer using an interpreter. The above hardware unit may be configured to operate via one or more software modules for performing an operation of various embodiments of the present disclosure, and vice versa.

A module or a program module may include at least one of the above elements, or a part of the above elements may be omitted, or additional other elements may be further included. Operations performed by a module, a program module, or other elements may be executed sequentially, in parallel, repeatedly, or in a heuristic method. In addition, some operations may be executed in different sequences or may be omitted. Alternatively, other operations may be added.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. An electronic device comprising:
a display;

a communication interface;
a memory storing instructions; and
at least one processor configured to execute the stored instructions to:
implement a first content in a 3-dimensional (3D) virtual space;
obtain a user's gaze information from a head mounted display (HMD) device connected to the electronic device based on a movement of the user wearing the HMD device through the communication interface while the first content is reproduced;
determine a field of view (FOV) based on the gaze information;
render an area corresponding to the FOV of the first content being implemented in the 3D virtual space;
store information relating to the FOV in the memory as metadata of the first content in response to a specified event; and
store at least a portion of the area corresponding to the FOV in the memory as a thumbnail of the first content in response to the specified event,
wherein the thumbnail of the first content is generated based on, at least, a reference point corresponding to a center position of the FOV,
wherein an initial gaze information at a time in which the first content begins to be reproduced is defined to correspond to a particular region of the first content in advance of the first content being reproduced,
wherein at least one of a size, a resolution, and a horizontal to vertical ratio of the thumbnail is determined based on the reference point and a characteristic of an application executing the first content, and
wherein the at least one processor is further configured to:
generate a thumbnail cache in a plurality of sizes to support views of the plurality of sizes, and
link and store a key value for identifying the first content and the thumbnail when generating the thumbnail cache.

2. The electronic device of claim 1, wherein the at least one processor is further configured to execute the stored instructions to generate the thumbnail of the first content based on the metadata and a characteristic of an application executing the first content.

3. The electronic device of claim 1, wherein the first content corresponds to one of a 360-degree image and 3D virtual reality data.

4. The electronic device of claim 1, wherein the first content corresponds to a 360-degree video.

5. The electronic device of claim 4, wherein the at least one processor is further configured to execute the stored instructions to additionally store, in the metadata, presentation time stamp (PTS) information of the first content at the time when the specified event occurred.

6. The electronic device of claim 1, wherein the at least one processor is further configured to execute the stored instructions to:
display a contents list including the first content on the display; and
display the thumbnail of the first content in the contents list based on the metadata.

7. The electronic device of claim 6, wherein the at least one processor is further configured to execute the stored instructions to execute the first content in response to a selection of the thumbnail of the first content.

8. The electronic device of claim 1, wherein the specified event corresponds to an instruction to end the first content.

9. The electronic device of claim 8, wherein the at least one processor is further configured to execute the stored instructions to re-execute the first content based on the metadata, after execution of the first content ends.

10. The electronic device of claim 5, wherein the at least one processor is further configured to execute the stored instructions to re-execute the first content based on the PTS information and the information relating to the FOV, after execution of the first content ends.

11. The electronic device of claim 1, wherein the at least one processor is further configured to execute the stored instructions to determine a reproduction location of a second content based on whether FOV information exists in metadata of the second content, in response to implementing the second content.

12. The electronic device of claim 11, wherein the at least one processor is further configured to execute the stored instructions to reproduce the second content from the FOV when the FOV information exists in the metadata of the second content.

13. The electronic device of claim 11, wherein the at least one processor is further configured to execute the stored instructions to reproduce the second content from a pre-defined reference location when the FOV information does not exist in the metadata of the second content.

14. An electronic device comprising:
a memory storing instructions;
a communication interface;
a display; and
at least one processor configured to execute the stored instructions to:
implement a first content in a three-dimensional (3D) virtual space;
obtain a user's gaze information from a head mounted display (HMD) device connected to the electronic device based on a movement of the user wearing the HMD device through the communication interface while the first content is reproduced;
determine a field of view (FOV) based on the gaze information;
render an area corresponding to a field of view (FOV) of the first content;
store a thumbnail of the first content generated based on, at least, a reference point corresponding to a center position of the FOV in the memory in response to ending implementing of the first content; and
store at least a portion of the area corresponding to the FOV in the memory as a thumbnail of the first content in response to the specified event, wherein an initial gaze information at a time in which the first content begins to be reproduced is defined to correspond to a particular region of the first content in advance of the first content being reproduced, wherein at least one of a size, a resolution, and a horizontal to vertical ratio of the thumbnail is determined based on the reference point and a characteristic of an application executing the first content, and
wherein the at least one processor is further configured to:
generate a thumbnail cache in a plurality of sizes to support views of the plurality of sizes, and
link and store a key value for identifying the first content and the thumbnail when generating the thumbnail cache.

15. The electronic device of claim 14, wherein the information relating to the FOV includes coordinates of a center point of the FOV.

16. The electronic device of claim 14, wherein the at least one processor is further configured to execute the stored instructions to:
    execute an application to display a contents list including a plurality of thumbnails on the display; and
    generate the thumbnail of the first content based on a size of an area where a defined thumbnail is displayed in the application and the information relating to the FOV.

17. The electronic device of claim 14, wherein the at least one processor is further configured to execute the stored instructions to link and store the thumbnail and a key value of the first content in the memory, and wherein the key value of the first content includes at least one of a path along which the first content is stored and a date when the first content is generated.

18. A non-transitory computer-readable storage medium storing instructions that, when executed by at least one processor of an electronic device, allow the electronic device to:
    implement a first content in a 3-dimensional (3D) virtual space;
    obtain a user's gaze information from a head mounted display (HMD) device connected to the electronic device based on a movement of the user wearing the HMD device through the communication interface while the first content is reproduced;
    determine a field of view (FOV) based on the gaze information;
    render an area corresponding to a field of view (FOV) of the first content being implemented in the 3D virtual space;
    store information relating to the FOV in the memory as metadata of the first content in response to a specified event; and
    store at least a portion of the area corresponding to the FOV in the memory as a thumbnail of the first content in response to the specified event,
wherein the thumbnail of the first content is generated based on, at least, a reference point corresponding to a center position of the FOV,
wherein an initial gaze information at a time in which the first content begins to be reproduced is defined to correspond to a particular region of the first content in advance of the first content being reproduced,
wherein at least one of a size, a resolution, and a horizontal to vertical ratio of the thumbnail is determined based on the reference point and a characteristic of an application executing the first content, and
wherein the at least one processor is further configured to:
generate a thumbnail cache in a plurality of sizes to support views of the plurality of sizes, and
link and store a key value for identifying the first content and the thumbnail when generating the thumbnail cache.

\* \* \* \* \*